(12) United States Patent
Kim et al.

(10) Patent No.: US 11,968,690 B2
(45) Date of Patent: *Apr. 23, 2024

(54) METHOD AND DEVICE FOR TRANSMITTING/RECEIVING CONTROL INFORMATION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jeongho Yeo, Gyeonggi-do (KR); Youngbum Kim, Gyeongg-do (KR); Seunghoon Choi, Gyeonggi-do (KR); Heedon Gha, Gyeonggi-do (KR); Taehan Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,815

(22) Filed: Aug. 8, 2022

(65) Prior Publication Data

US 2022/0386356 A1 Dec. 1, 2022

Related U.S. Application Data

(63) Continuation of application No. 16/765,108, filed as application No. PCT/KR2018/014114 on Nov. 16, 2018, now Pat. No. 11,412,496.

(30) Foreign Application Priority Data

Nov. 17, 2017 (KR) .................. 10-2017-0154193
Jan. 25, 2018 (KR) .................. 10-2018-0009615

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 1/1861* (2013.01); *H04W 72/12* (2013.01); *H04W 72/21* (2023.01)

(58) Field of Classification Search
CPC ............ H04L 1/1812; H04W 72/0413; H04W 72/042; H04W 72/12
See application file for complete search history.

(56) References Cited

U.S. PATENT DOCUMENTS 10,771,225 B2 *  9/2020  Park .......................... H04L 1/08
10,925,079 B2 *  2/2021  Park ...................... H04L 5/0092
(Continued)

FOREIGN PATENT DOCUMENTS

BR   112019022346 A2 *  5/2020  .......... H04W 72/042
CA        3047490 A1 *  6/2018  .......... H04L 5/0005
(Continued)

OTHER PUBLICATIONS

NTT Docomo, Inc., "DL/UL Scheduling and HARQ Management", R1-1718217, 3GPP TSG RAN WG1 Meeting 90bis, Oct. 9-13, 2017, 14 pages.

(Continued)

*Primary Examiner* — Eric Nowlin
(74) *Attorney, Agent, or Firm* — The Farrell Law Firm, P.C.

(57) ABSTRACT

Methods and apparatuses are provided in a wireless communication system. Mini slot length information indicating mini slot length in a number of symbols is received from a base station via higher layer signaling. Downlink control information (DCI) including a number of mini slots for a hybrid automatic repeat and request (HARQ) feedback transmission is received from the base station. A mini slot for the HARQ feedback transmission is identified based on the mini slot length information and the number of mini slots (Continued)

for the HARQ feedback transmission. The HARQ feedback information is transmitted to the base station on a physical uplink control channel (PUCCH) based on the identified mini slot.

16 Claims, 10 Drawing Sheets

(51) Int. Cl.
*H04L 1/1829* (2023.01)
*H04W 72/12* (2023.01)
*H04W 72/21* (2023.01)

(56) References Cited

U.S. PATENT DOCUMENTS

| | | | |
|---|---|---|---|
| 11,044,038 B2* | 6/2021 | Li | H04L 1/0006 |
| 11,101,943 B2 | 8/2021 | Fu | |
| 11,147,068 B2* | 10/2021 | Tang | H04W 72/0446 |
| 11,412,496 B2* | 8/2022 | Kim | H04L 1/1864 |
| 11,552,744 B2* | 1/2023 | Takeda | H04L 1/1858 |
| 2017/0105198 A1 | 4/2017 | Fu | |
| 2017/0223702 A1 | 8/2017 | Yin | |
| 2019/0158251 A1* | 5/2019 | Park | H04L 1/1896 |
| 2019/0173650 A1 | 6/2019 | Park | |
| 2019/0363842 A1 | 11/2019 | Fu | |
| 2020/0052811 A1* | 2/2020 | Li | H04L 5/0055 |
| 2020/0053677 A1 | 2/2020 | Tilrola | |
| 2020/0119880 A1 | 4/2020 | Liu | |
| 2020/0128542 A1* | 4/2020 | Tang | H04W 72/23 |
| 2020/0128578 A1* | 4/2020 | Park | H04W 72/0446 |
| 2020/0366417 A1 | 11/2020 | Lei | |
| 2020/0366425 A1* | 11/2020 | Takeda | H04L 5/0055 |
| 2020/0374048 A1 | 11/2020 | Lel | |
| 2020/0374090 A1* | 11/2020 | Park | H04L 1/1812 |
| 2020/0374912 A1 | 11/2020 | Takeda | |
| 2021/0068148 A1 | 3/2021 | Yamamoto | |
| 2021/0306107 A1 | 9/2021 | Yin | |
| 2022/0007368 A1 | 1/2022 | Tang | |

FOREIGN PATENT DOCUMENTS

| | | | | |
|---|---|---|---|---|
| CA | 3047490 C | * | 9/2023 | H04L 5/0005 |
| CN | 108365879 A | * | 8/2018 | H04B 7/06 |
| CN | 111107648 | | 5/2020 | |
| CN | 111344973 A | * | 6/2020 | H04L 1/08 |
| CN | 111107648 | | 3/2021 | |
| CN | 108365879 B | * | 7/2021 | H04B 7/06 |
| CN | 111344973 B | * | 1/2023 | H04L 1/08 |
| EP | 3711215 A2 | * | 9/2020 | H04L 1/08 |
| EP | 3471491 B1 | * | 10/2021 | H04B 7/0617 |
| EP | 3606210 B1 | * | 2/2023 | H04W 72/042 |
| ES | 2941046 T3 | * | 5/2023 | H04W 72/042 |
| KR | 10-2015-0018016 | | 2/2015 | |
| WO | WO 2017/132454 | | 8/2017 | |
| WO | WO-2019099197 A2 | * | 5/2019 | H04L 1/08 |
| WO | WO-2019099197 A3 | * | 6/2019 | H04L 1/08 |
| WO | WO-2021109483 A1 | * | 6/2021 | H04L 1/1861 |

OTHER PUBLICATIONS

Huawei, Ericsson, AT&T, Nokia, "On Slot-based and Non-Slot-based Scheduling", R1-1718874, 3GPP TSG RAN WG1 Meeting 90bis, Oct. 9-13, 2017, 2 pages.
AT&T, "Scheduling Aspects of Mini-slots", R1-1718403, 3GPP TSG RAN WG1 Meeting 90bis, Oct. 9-13, 2017, 9 pages.
International Search Report dated Feb. 22, 2019 issued in counterpart application No. PCT/KR2018/014114, 21 pages.
AT&T, HARQ-ACK feedback timing for FDD, semi-static TDD and mini-slot based transmissions, Jun. 27, 2017, 3GPP TSG RAN WG1 NR Ad-Hoc#2, Tdoc: R1-1710418 (Year: 2017).
Nokia et al., Timing aspects for HARQ-ACK feedback, Jun. 27, 2017, 3GPP TSG RAN WG1 NR Ad-Hoc#2, Tdoc: R1710998 (Year: 2017).
Huawei et al., Unified design for slot and mini-slot, Jun. 27, 2017, 3GPP TSG RAN WG1 NR Ad-Hoc#2, Tdoc: R1-1711435 (Year: 2017).
NTT Docomo, Inc. Views on DM-RS for mini-slot, Oct. 9, 2017, 3GPP TSG RAN WG1 Meeting #90bis, Tdoc: R1-1718202 (Year: 2017).
AT&T, HARQ management for mini-slots, Oct. 9, 2017, 3GPP TSG RAN WG1 Meeting #90bis, Tdoc: R1-1718401 (Year: 2017).
AT&T, Scheduling aspects of mini-slots, Oct. 9, 2017, 3GPP TSG RAN WG1 Meeting #90bis, Tdoc: R1-1718403 (Year: 2017).

* cited by examiner

METHOD AND DEVICE FOR TRANSMITTING/RECEIVING CONTROL INFORMATION IN WIRELESS COMMUNICATION SYSTEM

PRIORITY

This application is a Continuation Application of U.S. patent application Ser. No. 16/765,108, filed in the U.S. Patent and Trademark Office on May 18, 2020, which is a National Phase Entry of PCT International Application No. PCT/KR2018/014114, which was filed on Nov. 16, 2018, and claims priority to Korean Patent Application Nos. 10-2017-0154193 and 10-2018-0009615, which were filed on Nov. 17, 2017, and Jan. 25, 2018, respectively, the content of each of which is incorporated herein by reference.

TECHNICAL FIELD

The present disclosure relates to a wireless communication system, and more particularly, to a method and apparatus for smoothly providing a service in a wireless communication system.

BACKGROUND

To meet the soaring demand with respect to wireless data traffic due to the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as a beyond-4G-network communication systems or a post-long term evolution (LTE) systems. For higher data transmission rates, the implementation of 5G communication systems on ultra-high frequency bands (mmWave), e.g., 60 GHz, is being considered. In the 5G communication system, to alleviate propagation path loss and to increase a propagation distance in the ultra-high frequency band, beamforming, massive multi-input multi-output (MIMO), full dimensional MIMO (FD-MIMO), array antenna, analog beamforming, and large scale antenna are being discussed. In order to improve system networks, for 5G communication systems, various technologies have been developed, such as, evolved or advanced small cell, cloud radio access network (cloud RAN), ultra-dense network, device-to-device (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. In order to implement IoT, technological elements, such as sensing technology, wired/wireless communication and network infrastructure, service interface technology, and security technology, are required, and in this regard, technologies such as sensor networks, machine to machine (M2M), machine-type communication (MTC), and so forth have recently been researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication technology, such as a sensor network, M2M, MTC, etc., has been implemented by a scheme such as beamforming, MIMO, array antennas, and so forth. The application of cloud RAN as a Big Data processing technology may also be an example of the convergence of 3 eG technology and IoT technology.

As described above, various services may be provided as wireless communication systems develop, and accordingly, ways of smoothly providing such services are required.

SUMMARY

Disclosed embodiments provide a method and apparatus for smoothly providing a service in a wireless communication system.

According to an embodiment, a method, performed by a user equipment (UE) in a wireless communication system, is provided. Mini slot length information indicating mini slot length in a number of symbols is received from a base station via higher layer signaling. Downlink control information (DCI) including a number of mini slots for a hybrid automatic repeat and request (HARQ) feedback transmission is received from the base station. A mini slot for the HARQ feedback transmission is identified based on the mini slot length information and the number of mini slots for the HARQ feedback transmission. The HARQ feedback information is transmitted to the base station on a physical uplink control channel (PUCCH) based on the identified mini slot.

According to an embodiment, a method, performed by a base station in a wireless communication system, is provided. Mini slot length information indicating mini slot length in a number of symbols is transmitted to a UE via higher layer signaling. DCI including a number of mini slots for a HARQ feedback transmission is transmitted to the UE. HARQ feedback information on a PUCCH is received from the UE based on a mini slot identified based on the mini slot length information and the number of mini slots for the HARQ feedback transmission.

According to an embodiment, a UE in a wireless communication system is provided. The UE includes a transceiver and a processor coupled with the transceiver. The processor is configured to receive, from a base station, mini slot length information indicating mini slot length in a number of symbols, via higher layer signaling. The processor is also configured to receive, from the base station, DCI including a number of mini slots for a HARQ feedback transmission. The processor is further configured to identify a mini slot for the HARQ feedback transmission based on the mini slot length information and the number of mini slots for the HARQ feedback transmission. The processor is also configured to transit, to the base station, the HARQ feedback information is transmitted to the base station on a PUCCH based on the identified mini slot.

According to an embodiment, a base station in a wireless communication system is provided. The base station includes a transceiver and a processor coupled with the transceiver. The processor is configured to transmit, to a UE, mini slot length information indicating mini slot length in a number of symbols, via higher layer signaling. The processor is also configured to transit, to the UE, DCI including a number of mini slots for a HARQ feedback transmission. The processor is further configured to receive, from the UE, HARQ feedback information on a PUCCH, based on a mini slot identified based on the mini slot length information and the number of mini slots for the HARQ feedback transmission.

BRIEF DESCRIPTION OF DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
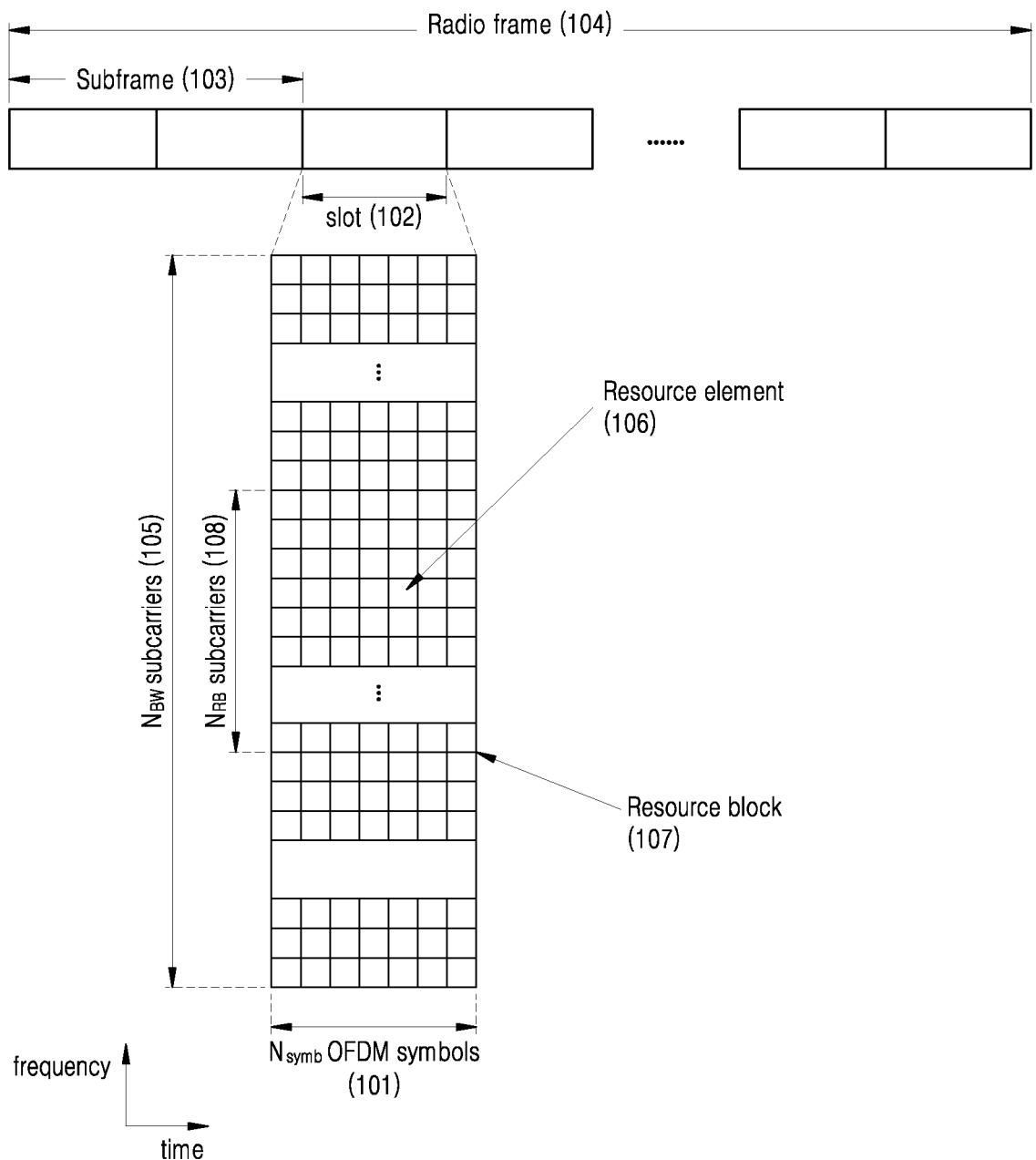
FIG. 1 illustrates a basic structure of a time-frequency domain, which is a downlink radio resource region of a long term evolution (LTE) system or a communication system that is similar to the LTE system.

Hereinafter, various embodiments of the present disclosure will be disclosed with reference to the accompanying drawings.

When embodiments of the present disclosure are described, technical matters that are well known in a technical field of the present disclosure and are not directly related to the present disclosure will not be described. By omitting an unnecessary description, the subject matter of the present disclosure will be more clearly described without being obscured.

For the same reason, some elements will be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims. Throughout the specification, an identical reference numeral will indicate an identical element.

Hereinbelow, the base station is an entity that performs resource assignment of the terminal, and may be at least one of gNode B, evolved Node B (eNode B), Node B, base station (BS), a wireless access unit, a base station controller, or a node on a network. The terminal may include a user equipment (UE), a mobile station (MS), a cellular phone, a smartphone, a computer, or a multimedia system capable of performing communication functions. In the disclosure, a downlink (DL) may mean a wireless transmission path of a signal for transmission from the base station to the UE, and an uplink (UL) may mean a wireless transmission path of a signal for transmission from the UE to the base station. While the present disclosure is described by using an LTE or LTE-Advanced (LTE-A) system as an example, the embodiments of the disclosure may also be applied to other communication systems having a similar technical background or channel form. For example, a fifth-generation mobile communication technology (5G, new radio, NR) developed after LTE-A may be included in the example, and 5G described below may mean a concept including existing LTE, LTE-A, and other similar services. Also, the present disclosure may also be applied to other communication systems through some modifications within a range that does not largely depart from the scope of the disclosure based on determination of a skilled person.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

The term '~unit' used herein refers to software or a hardware element such as a field-programmable gate array (FPGA), an application specific integrated circuit (ASIC), etc., and 'unit' plays specific roles. However, the meaning of '~unit' is not limited to software or hardware. 'unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments of the disclosure, '~unit' may include one or more processors.

A wireless communication system has evolved from an initial one that provides a voice-oriented service to a broadband wireless communication system that provides a high-speed and high-quality packet data service, like the communication standards, such as 3GPP high speed packet access (HSPA), LTE or Evolved Universal Terrestrial Radio Access (E-UTRA), LTE-Advanced (LTE-A), LTE-Pro, 3GPP2 high rate packet data (HRPD), Ultra Mobile Broadband (UMB), the Institute of Electrical and Electronics Engineers (IEEE) 802.16e, etc.

In an LTE system as a representative example of a broadband wireless communication system, orthogonal frequency division multiplexing (OFDM) is employed in a DL and single carrier frequency division multiple access (SC-FDMA) is employed in an UL. The UL may mean a radio link through which a UE transmits data or a control signal to a base station (eNodeB or BS), and the DL means a radio link through which the base station transmits data or a control signal to the UE. The above-described multiple access scheme separates data or control information for each user by allocating and operating time-frequency resources on which the data or the control information is carried for each user, so that the time-frequency resources do not overlap each other, that is, so that orthogonality is realized.

A 5G or NR communication system, that is, a post-LTE communication system, needs to freely reflect various requirements from a user and a service provider, such that a service satisfying the various requirements at the same time has to be supported. Services taken into consideration for the 5G or NR communication system may include enhanced mobile broadband (eMBB) communication, massive machine type communication (mMTC), ultra reliability low latency communication (URLLC), etc.

The eMBB may aim to provide a further enhanced data transmission speed than a data transmission speed supported by existing LTE, LTE-A, or LTE-Pro. For example, in the 5G or NR communication system, with respect to one BS, the eMBB needs to provide a peak data rate of 20 Gbps in the DL and a peak data rate of 10 Gbps in the UL. Furthermore, the 5G or NR communication system should be able to provide an increased user-perceived data rate while providing the peak data rate. In order to satisfy such a requirement, various transmission and reception technologies including a further enhanced MIMO transmission technology must be improved. Moreover, the LTE system transmits a signal using a 20 MHz maximum transmission bandwidth in the 2 GHz band, whereas the 5G or NR communication system transmits a signal using a frequency bandwidth wider than 20 MHz in a frequency band of 3 to 6 GHz or greater than 6 GHz, thus satisfying the data rates required for the 5G communication system.

In the 5G or NR communication system, mMTC is taken into consideration in order to support application services, such as IoT. Access by many UEs within a single cell, coverage improvement of a UE, an increased battery time, a reduction in the cost of a UE are required in order for mMTC to efficiently provide for the IoT. The IoT is attached to various sensors and various devices to provide a communication function, and thus should be able to support many UEs (e.g., 1,000,000 UEs/km$^2$) within a cell. Furthermore, a UE supporting mMTC requires wider coverage compared to other services provided by the 5G or NR communication system because there is a high possibility that the UE may be located in a shadow area not covered by a cell, such as the underground of a building. A UE supporting mMTC needs to be a cheap UE, and requires a very long battery life time, such as 10 to 15 years, because it is difficult to frequently replace the battery of the UE.

Finally, URLLC is a cellular-based wireless communication service used for mission-critical purposes. For example, URLLC may be used for services used for remote control of robots or machinery, industrial automation, unmanned aerial vehicles, remote health care, emergency alert, etc. Accordingly, communication provided by URLLC should provide very low latency and very high reliability. For example, services supporting URLLC may require air interface latency to be less than 0.5 millisecond and also a packet error rate of 10-5 or less. Accordingly, for services supporting URLLC, the 5G or NR communication system needs to provide a transmission time interval (TTI) less than that of other services, and also requires the design for allocating resources in a wide frequency band in order to secure reliability of a communication link.

Three services of the above-described 5G or NR communication system, that is, eMBB, URLLC, and mMTC, may be multiplexed and transmitted in one system. In order to satisfy different requirements of the services, different transmission and reception schemes and parameters may be used between the services.

In the 5G or NR communication system, both slot-based scheduling and mini-slot-based scheduling may be supported as a scheduling method for a physical downlink share channel (PDSCH). In the 5G or NR communication system, information about a hybrid automatic repeat and request (HARQ) timing (or HARQ timing information) for a PDSCH may be indicated through downlink control information (DCI) to a UE. The HARQ timing information for the PDSCH may refer to a timing to transmit UL control information including an HARQ acknowledgement (ACK) or negative ACK (HACK) for the PDSCH through a physical UL control channel or a physical UL shared channel (PUSCH). In the present disclosure, a description will be made of a method for differently determining the HARQ timing indicated by the DCI based on a PDSCH scheduling environment. More specifically, a description will be made of a mini-slot index-based HARQ timing indication method, a symbol index-based HARQ timing indication method, a HARQ timing indication method based on a PDCCH monitoring period, etc.

The 5G or NR communication system supports randomization with respect to a search space of a DL control channel over time. That is, a search space at a particular point in time may be different from a search space at another point in time. In this way, a problem may be solved in which a search space of a particular UE is not available to other UEs. On the other hand, in the 5G or NR communication system, a monitoring period may be set differently for a different DCI format. For example, a DCI format A may be configured for monitoring in a period of A and a DCI format B may be configured for monitoring in a period of B. As a monitoring period varies with each DCI format, monitoring may be performed in a different search space, increasing the number of times of unnecessary blind decoding. In the present disclosure, a method for effective randomization with respect to a search space will be described.

FIG. 1 illustrates a basic structure of a time-frequency domain, which is a downlink radio resource region of a long term evolution (LTE) system or a communication system that is similar to the LTE system.

Referring to FIG. 1, a horizontal axis represents a time domain, and a vertical axis represents a frequency domain. A minimum transmission unit in the time domain is an OFDM symbol, in which $N_{symb}$ OFDM symbols 101 may constitute one slot 102 and two slots may constitute one subframe 103. The length of the slot 102 may be 0.5 ms, and the length of the subframe 103 may be 1.0 ms. A radio frame 104 may be a unit of the time-domain, which includes ten subframes 103. A minimum transmission unit in the frequency domain may be a subcarrier, and the bandwidth of the whole system transmission band may include $N_{BW}$ subcarriers 105 in total. In the time-frequency domain, a basic unit of a resource may be a resource element (RE) 106, and may be indicated as an OFDM symbol index and a subcarrier index. A resource block (RB) or a physical RB (PRB) 107 may be defined as $N_{symb}$ consecutive OFDM symbols 101 in the time domain and $N_{RB}$ consecutive subcarriers 108 in the frequency domain. Accordingly, one RB 107 may be composed of $N_{symb} \times N_{RB}$ REs 106. Generally, a minimum transmission unit of data may be an RB. In the LTE system, generally, $N_{symb}=7$, $N_{RB}=12$, and $N_{BW}$ and $N_{RB}$ may be proportional to the bandwidth of the system transmission band.

Next, DCI in the LTE communication system and the LTE-A communication system will be described in detail.

In the LTE system, scheduling information regarding DL data or UL data may be delivered to the UE from the BS through DCI. The DCI may define various formats, such that a DCI format may be determined and applied according to whether scheduling information is the scheduling information regarding the UL data or the scheduling information regarding the DL data, whether the DCI is compact DCI having small-size control information, whether spatial multiplexing using multiple antennas is applied, whether the DCI is DCI for power control, etc. For example, DCI format 1, which is scheduling control information for DL data, may be configured to include control information as below.

Resource Allocation Type 0/1 Flag: used to indicate whether a resource allocation scheme is type 0 or type 1. Type 0 allocates a resource in the unit of a resource block group (RBG) by applying a bitmap scheme. In the LTE system, the basic unit of scheduling is an RB expressed with a time and frequency-domain resource, and the RBG includes a plurality of RBs and is the basic unit of scheduling in Type 0. Type 1 allocates a particular RB in the RBG.

Resource Block Assignment: used to notify an RB assigned for data transmission. A resource to be expressed may be determined based on a system bandwidth and a resource assignment scheme.

Modulation and Coding Scheme (MCS): used to notify a modulation scheme used for data transmission and a size of a transport block that is data to be transmitted.

HARQ Process Number: used to notify a process number of HARQ.

New Data Indicator: used to notify whether transmission is HARQ initial transmission or retransmission.

Redundancy version: used to notify a redundancy version of HARQ.

Transmit Power Control (TPC) command for Physical Uplink Control Channel (PUCCH): used to notify a TPC command for a PUCCH that is a UL control channel.

The DCI may be transmitted through a physical downlink control channel (PDCCH) or an enhanced PDCCH (EPDCCH), which is a DL physical control channel, through channel coding and modulation.

A cyclic redundancy check (CRC) may be added to a DCI message payload, and the CRC may be scrambled by a radio network temporary identifier (RNTI) corresponding to an identity of the UE. Depending on the purpose of the DCI message, e.g., UE-specific data transmission, power control command, random access response, etc., different RNTIs may be used. That is, the RNTI may not be explicitly transmitted and may be transmitted through CRC calculation. Upon receiving the DCI message transmitted on the PDCCH, the UE may check the CRC by using the assigned RNTI and thus determine that the DCI message is transmitted thereto when the CRC check result is correct.

Figure 2:
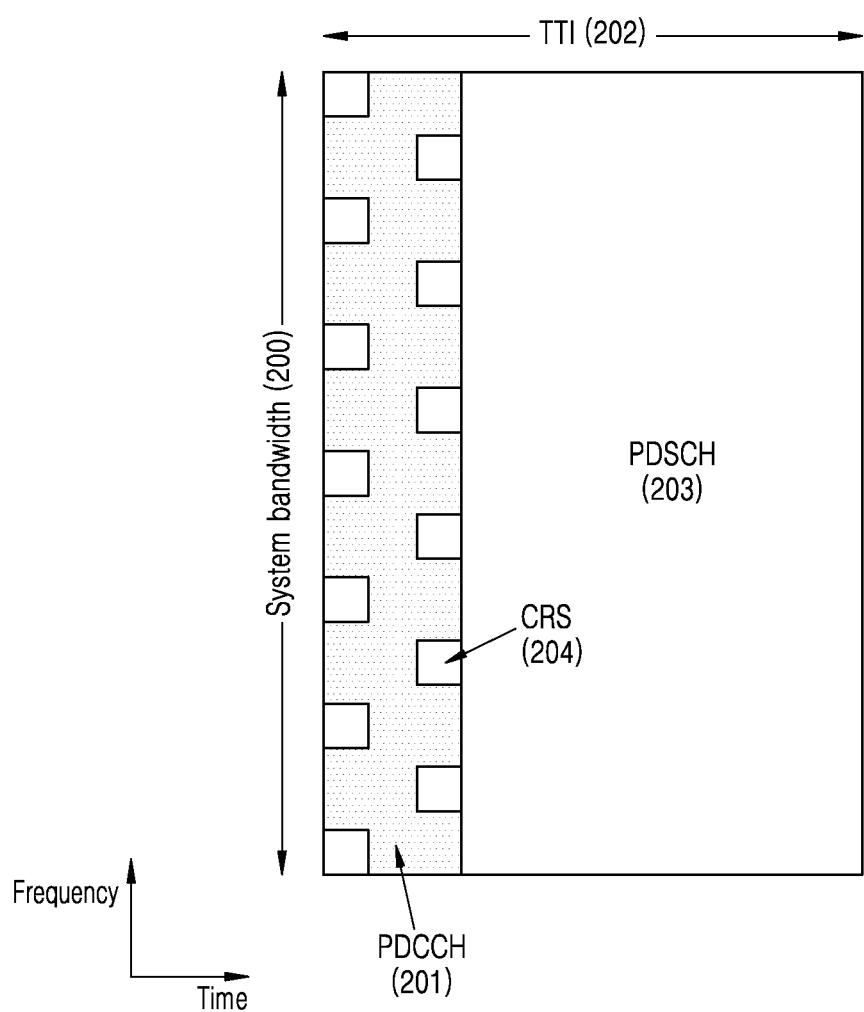
FIG. 2 illustrates a downlink control channel of an LTE system or a communication system that is similar to the LTE system.

FIG. 2 illustrates a downlink control channel of an LTE system or a communication system that is similar to the LTE system.

Referring to FIG. 2, a PDCCH 201 may be time-multiplexed with a data transmission channel, a PDSCH 203, and may be transmitted over the entire system bandwidth. A time domain of the PDCCH 201 may be expressed with the number of OFDM symbols, which is indicated to the UE by a control format indicator (CFI) transmitted through a physical control format indicator channel (PCFICH). By assigning the PDCCH 201 to a front OFDM symbol of a subframe, the UE may be allowed to decode DL scheduling allocation as fast as possible, thereby reducing a decoding delay for a DL shared channel (DL-SCH), i.e., a total DL transmission delay. One PDCCH carries one DCI message and multiple UEs may be simultaneously scheduled in the DL and the UL, such that transmission of multiple PDCCHs may be performed at the same time in each cell. A CRS 204 may be used as a reference signal for decoding the PDCCH 201. The CRS 204 may be transmitted for each subframe over the entire band, and scrambling and resource mapping may vary with a cell identity (ID). The CRS 204 is a reference signal used in common by all UEs, such that UE-specific beamforming may not be used. Thus, a multi-antenna transmission scheme for a PDCCH in LTE may be defined to open-loop transmission diversity. The number of ports of the CRS may be implicitly indicated to the UE from decoding of a physical broadcast channel (PBCH).

Resource allocation of the PDCCH 201 may be based on a control channel element (CCE), in which one CCE includes nine resource element groups (REGs), i.e., a total of 36 REs. The number of CCEs required for the particular PDCCH 201 may be 1, 2, 4, or 8, which may differ with a channel coding rate of the DCI message payload. As such, different CCE numbers may be used to implement link adaptation of the PDCCH 201. The UE may detect a signal in a state of being unaware of information about the PDCCH 201, and may define a search space indicating a set of CCEs for blind decoding in LTE. The search space may include a plurality of sets in an aggregation level (AL) in each CCE, and may be implicitly defined through a function and a subframe number by a UE ID without being explicitly signaled. In each subframe, the UE may perform decoding with respect to the PDCCH 201 for all possible candidates that may be generated from CCEs in a set search space and process information which is declared to be valid to the UE through the CRC check.

The search space may be classified into a UE-specific search space and a common search space. UEs in a particular group or all the UEs may investigate the common search space of the PDCCH 201 in order to receive cell-common control information such as dynamic scheduling or paging message for the system information. For example, scheduling allocation information for a UL data channel for transmission of system information block (SIB)-1 including cell operator information, etc., may be received by investigating the common search space of the PDCCH 201.

In LTE, the entire PDCCH area includes a set of CCEs in a logical area, and a search space including the set of the CCEs exists. The search space is classified into the common search space and the UE-specific search space, and a search space for the LTE PDCCH may be defined as shown in Table 1.

TABLE 1

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L \{ (Y_k + m') \bmod \lfloor N_{CCE,k} / L \rfloor \} + i$$

where $Y_k$ is defined below, $i = 0, ,L - 1$. For the common search space m' = m. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then m' = m , where $m = 0,...,M^{(L)} -1$. $M^{(L)}$ is the number of PDCCH candidates to monitor in the given search space. Note that the carrier indicator field value is the same as ServCellIndex For the common search spaces, $Y_k$ is set to 0 for the two aggregation levels L = 4 and L = 8 .
For the UE-specific search space at aggregation level L , the variable $Y_k$ is defined by
$$Y_k = (A \cdot Y_{k-1}) \bmod D$$
where $Y_{-1} = n_{RNTI} \neq 0$ , A = 39827 , D = 65537 and $k = \lfloor n_s/2 \rfloor$, $n_s$ is the slot number within a radio frame.
The RNTI value used for $n_{RNTI}$ is defined in subclause 7.1 in downlink and subclause 8 in uplink.

According to the above-described definition of the search space for the PDCCH, the UE-specific search space may not be explicitly signaled, but implicitly defined by a function and a subframe number by the UE ID. That is, the UE-specific search space may change with the subframe number, which may mean that the UE-specific search space may change over time, thus solving a problem where a particular UE may not use a search space due to the other UEs (a blocking problem). When all CCEs investigated by the UE are already used by other UEs scheduled in the same subframe and thus a UE may not be scheduled in the subframe, this problem may not occur in the next subframe because the search space changes over time. For example, even when UE-specific search spaces of UE 1 and UE 2 partially overlap with each other in a particular subframe, the UE-specific search spaces change for each subframe, such that overlapping in the next subframe is expected to differ from the overlapping in the particular subframe.

According to the above-described definition of the search space with respect to the PDCCH, the common search space may be defined as a pre-agreed CCE set because the UEs of the particular group or all the UEs need to receive the PDCCH. That is, the common search space does not change with the ID of the UE, the subframe number, etc. The common search space exists for transmission of various system messages, but may also be used for transmission of control information of a separate UE. In this way, the common search space may be used as a solution to a phenomenon where the UE fails to be scheduled due to a lack of resources available in the UE-specific search space.

The search space is a set of candidate control channels including CCEs for which the UE needs to attempt decoding in a given AL, and the UE may have a plurality of search spaces because there are several ALs where one, two, four, or eight CCEs are grouped into one group. In the LTE PDCCH, the number of PDCCH candidates the UE has to monitor in the search space may be defined according to the AL, as shown in Table 2.

TABLE 2

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

According to Table 2, the UE-specific search space supports ALs $\{1, 2, 4, 8\}$ for which the numbers of PDCCH candidates provided are defined as $\{6, 6, 2, 2\}$, respectively. The common search space supports ALs $\{4, 8\}$ for which the numbers of PDCCH candidates provided are defined as $\{4, 2\}$, respectively. The common search space supports the ALs $\{4, 8\}$ in order to improve coverage characteristics because a system message generally has to reach a cell boundary.

A DCI transmitted to the common search space is defined for a particular DCI format such as 0/1A/3/3A/1C corresponding to the purpose of power control with respect to a system message or a UE group. In the common search space, a DCI format having spatial multiplexing is not supported. A DL DCI format that has to be decoded in the UE-specific search space changes with a transmission mode set for a corresponding UE. The transmission mode is set through RRC signaling, such that an accurate subframe number is not designated regarding whether the setting is effective for the UE. Thus, the UE may operate not to lose communication by performing decoding with respect to a DCI format 1A regardless of the transmission mode.

In the LTE system, DL HARQ adopts an asynchronous HARQ scheme where a data retransmission timing is not fixed. That is, when the BS is fed back with HARQ NACK from the UE in response to initial transmission data, the BS may freely determine a transmission timing for retransmission data through scheduling. The UE may perform buffering with respect to data identified as an error as a result of decoding with respect to received data for an HARQ operation, and then perform combining with next retransmission data.

When the UE receives a PDSCH including DL data transmitted from the BS in a subframe n, the UE may transmit UL control information including HARQ ACK or NACK of DL data to the BS in a subframe (n+K) through a PUCCH or a PUSCH. In this case, k may be defined differently according to frequency division duplex (FDD) or time division duplex (TDD) of the LTE system and a subframe configuration thereof. For example, in an FDD LTE system, k may be fixed to 4. In a TDD LTE system, k may change with a subframe configuration and a subframe number. In data transmission through a plurality of carriers, a different k may be applied according to a TDD configuration of each carrier. For TDD, k may be determined according to a TDD UL/DL configuration as shown in Table 3.

TABLE 3

| UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5. 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

(Subframe n header spans columns 0–9)

In the LTE system, UL HARQ, unlike DL HARQ, adopts a synchronous HARQ scheme where a data transmission timing is fixed. That is, an UL/DL timing relationship among a PUSCH which is a physical channel for UL data transmission, a PDCCH which is a DL control channel preceding the PUSCH, and a physical hybrid indicator channel (PHICH) corresponding to the PUSCH, which is a physical channel in which a DL HARQ ACK/NACK is transmitted may be defined according to a rule described below.

When the UE receives the PDCCH including the UL scheduling control information transmitted from the BS or the PHICH in which the DL HARQ ACK/NACK is transmitted in the subframe n, the UE transmits UL data corresponding to the control information through the PUSCH in the subframe (n+k). In this case, k may be defined differently according to FDD or TDD of the LTE system and a configuration thereof. For example, in the FDD LTE system, k may be fixed to 4. In the TDD LTE system, k may change with a subframe configuration and a subframe number. In data transmission through a plurality of carriers, a different k may be applied according to a TDD configuration of each carrier. For TDD, k may be determined according to a TDD UL/DL configuration as shown in Table 4.

TABLE 4

| TDD UL/DL Configuration | 0 | 1 | 2 | 3 | 4 | 5 | 6 | 7 | 8 | 9 |
|---|---|---|---|---|---|---|---|---|---|---|
| 0 | | | | 4 | 7 | 6 | | | 4 | 7 | 6 |
| 1 | | | | 4 | 6 | | | | 4 | 6 | |
| 2 | | | | 6 | | | | | 6 | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | 4 | 7 | |

(subframe index n spans columns 0–9)

HARQ ACK/NACK information of the PUSCH transmitted by the UE in the subframe n may be transmitted from the BS to the UE through the PHICH in the subframe (n+k). In this case, k may be defined differently according to FDD or TDD of the LTE system and a configuration thereof. For example, in the FDD LTE system, k may be fixed to 4. In the TDD LTE system, k may change with a subframe configuration and a subframe number. In data transmission through a plurality of carriers, a different k may be applied according to a TDD configuration of each carrier. For TDD, k may be determined according to a TDD UL/DL configuration as shown in Table 4.

TABLE 5

| Configuration TDD UL/DL | 0 | 1 | 2 | 3 | 4 | 5 | 6 | 7 | 8 | 9 |
|---|---|---|---|---|---|---|---|---|---|---|
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

(subframe number n spans columns 0–9)

While the wireless communication system has been described based on the LTE system in the present disclosure, the present disclosure may also be applied to various wireless communication systems such as NR, 5G, etc., without being limited to the LTE system. When the present disclosure is applied to another wireless communication system, a changed k may be applied to a system using a modulation scheme corresponding to FDD.

So far, a description has been made of a method of transmitting and receiving a DL control channel and DL control information and of a search space in LTE and LTE-A. Hereinbelow, a DL control channel in a 5G or NR communication system will be described in more detail with reference to the accompanying drawings.

Figure 3:
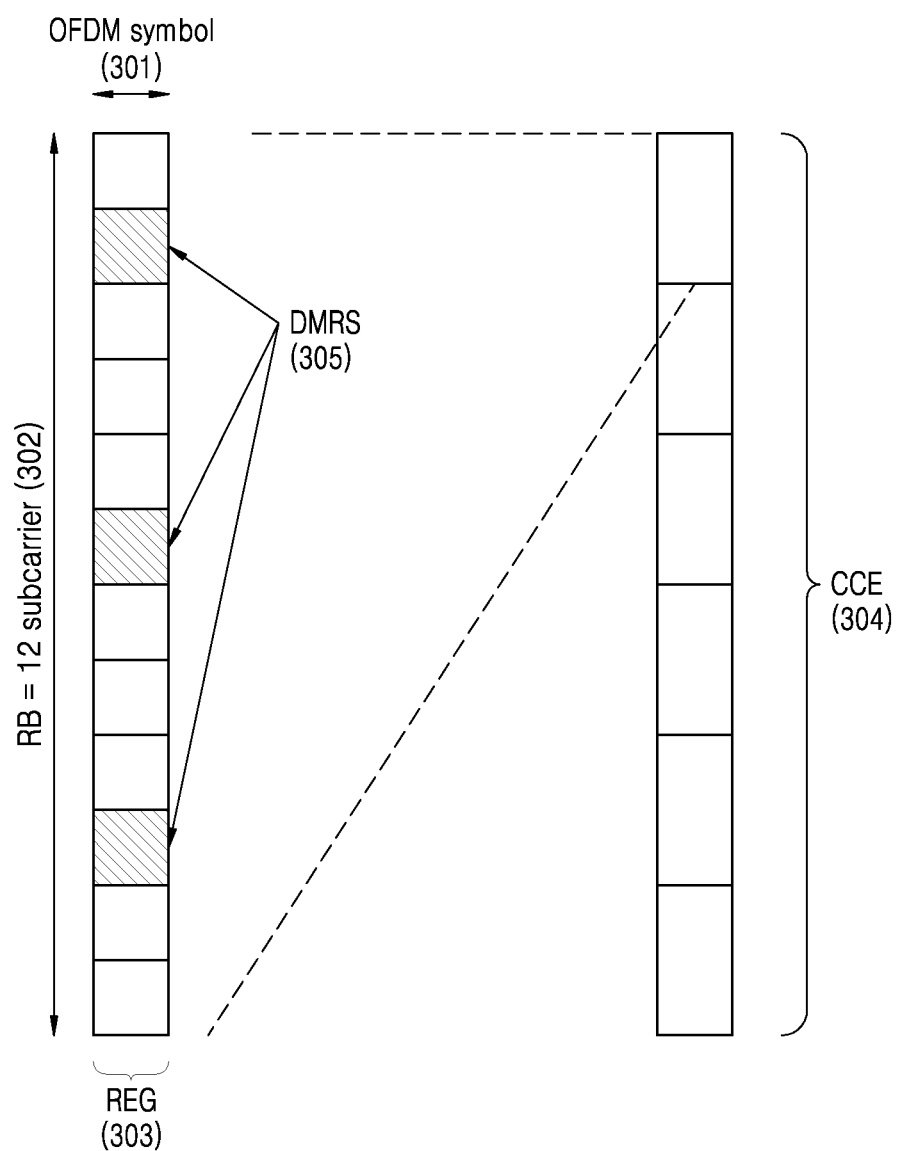
FIG. 3 illustrates a transmission resource of a downlink control channel in a $5^{th}$-generation (5G) or new radio (NR) communication system.

FIG. 3 illustrates a transmission resource of a DL control channel in a 5G or NR communication system.

Referring to FIG. 3, a basic unit REG 303 of a time and frequency resource constituting a control channel includes one OFDM symbol 301 along a time axis and 12 subcarriers, i.e., one RB 302 along a frequency axis. As the time-axis basic unit is assumed as one OFDM symbol 301 in configuring the basic unit of the control channel, a data channel and a control channel may be time-multiplexed in one subframe. A processing time of a user may be reduced by locating the control channel in front of the data channel, making it easy to satisfy the latency requirements. In the 5G or NR communication system, frequency multiplexing between the control channel and the data channel may be efficiently performed by configuring the frequency-axis basic unit of the control channel as the RB 302.

By concatenating the REG 303 shown in FIG. 3, control channel regions of various sizes may be configured. For example, in the 5G or NR communication system, when a basic unit to which a DL control channel is allocated is a CCE 304, the CCE 304 may include multiple REGs 303. Referring to FIG. 3, the REG 303 may include 12 REs, and when the CCE 304 includes six REGs 303, it means that the CCE 304 may include 72 REs. When a DL control region is configured, a corresponding region may include multiple CCEs, and a particular DL control channel may be mapped to one CCE or multiple CCEs for transmission according to an AL in the control region. CCEs in the control region are identified by numbers which may be assigned according to a logical mapping scheme.

The basic unit of the DL control channel shown in FIG. 3, i.e., the REG 303 may include both DCI-mapped REs and a region to which a DMRS 305, which is a reference signal for decoding the REs, is mapped. For example, as shown in FIG. 3, three DMRSs 305 may be transmitted in one REG 303.

Figure 4:
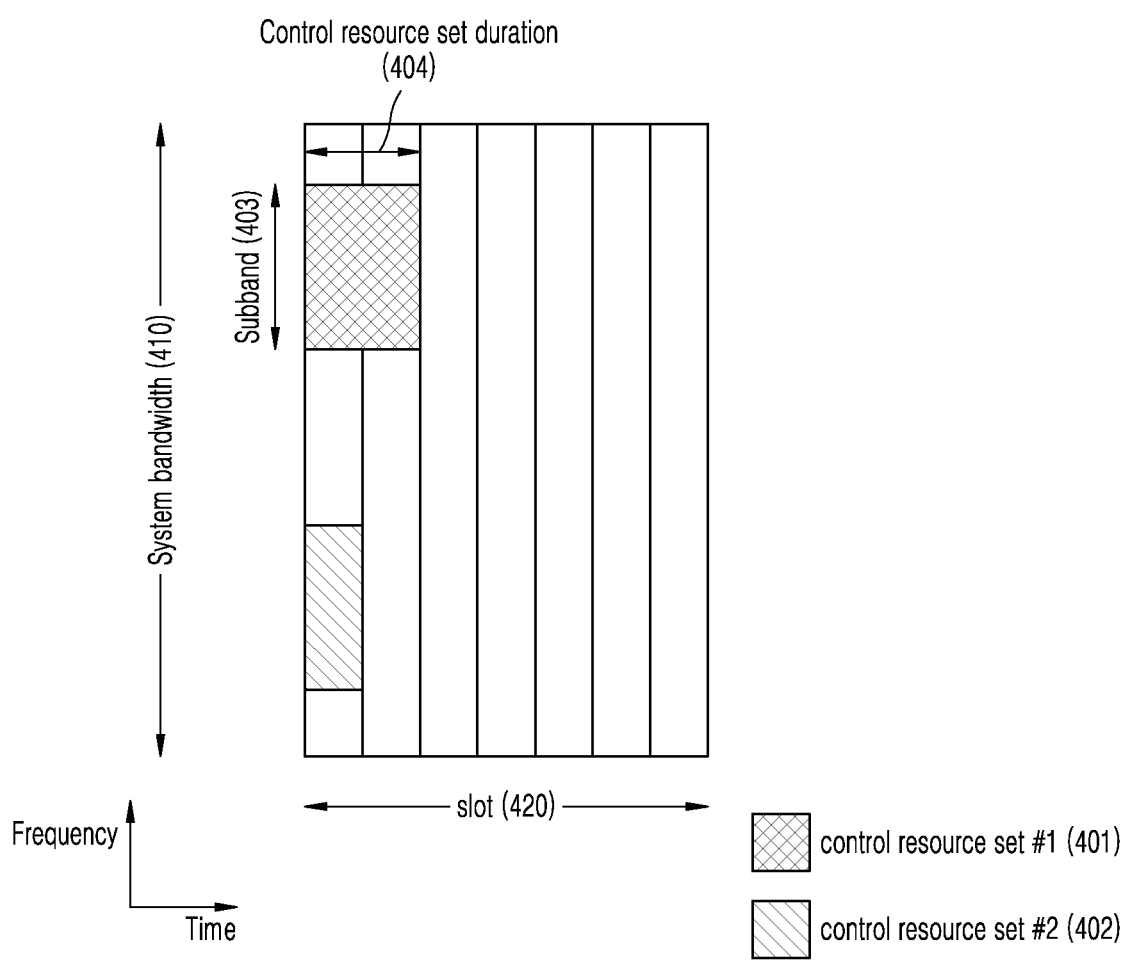
FIG. 4 illustrates an example of setting of a control region in a 5G or NR communication system.

FIG. 4 illustrates an example of setting of a control region (control resource set (CORESET)) in a 5G or NR communication system.

Referring to FIG. 4, a system bandwidth 410 is set in the frequency axis, and two control regions (a control region #1 401 and a control region #2 402) are set in one slot 420 in the time axis (in FIG. 4, it is assumed that one slot includes seven OFDM symbols). The control regions 401 and 402 may be set by a particular sub-band 403 in the entire system bandwidth 410 in the frequency axis. In the time axis, the control regions 401 and 402 may be set by one OFDM symbol or multiple OFDM symbols, which may be defined as a control resource set duration 404. In FIG. 4, the control region #1 401 is set by a control resource set duration of two OFDM symbols, and the control region #2 is set by a control resource set duration of one OFDM symbol.

The control region in the 5G or NR system may be set by higher layer signaling from the BS to the UE (e.g., system information, a master information block (MIB), radio resource control (RRC) signaling, etc.). Setting of the control region in the UE may mean providing information such as a position of the control region, a sub-band, resource allocation of the control region, a length of the control region, etc. For example, information provided below may be included.

TABLE 6

- Configuration information 1. Frequency-Axis RB Allocation information
- Configuration Information 2. Control Region Start Symbol
- Configuration Information 3. Control Region Symbol Length
- Configuration Information 4. REG Bundling Size
- Configuration Information 5. Transmission Mode (Interleaved Transmission Scheme or Non-Interleaved Transmission Scheme)
- Configuration Information 6. DMRS Configuration Information
- Configuration Information 7. Search Space Type (Common Search TABLE 6-continued Space, Group-Common Search Space, UE-Specific Search Space)
- Configuration Information 8. Monitoring Period
- Others In addition to the above-described setting information, various information required for transmission of a DL control channel may be set in the UE.

Figure 5:
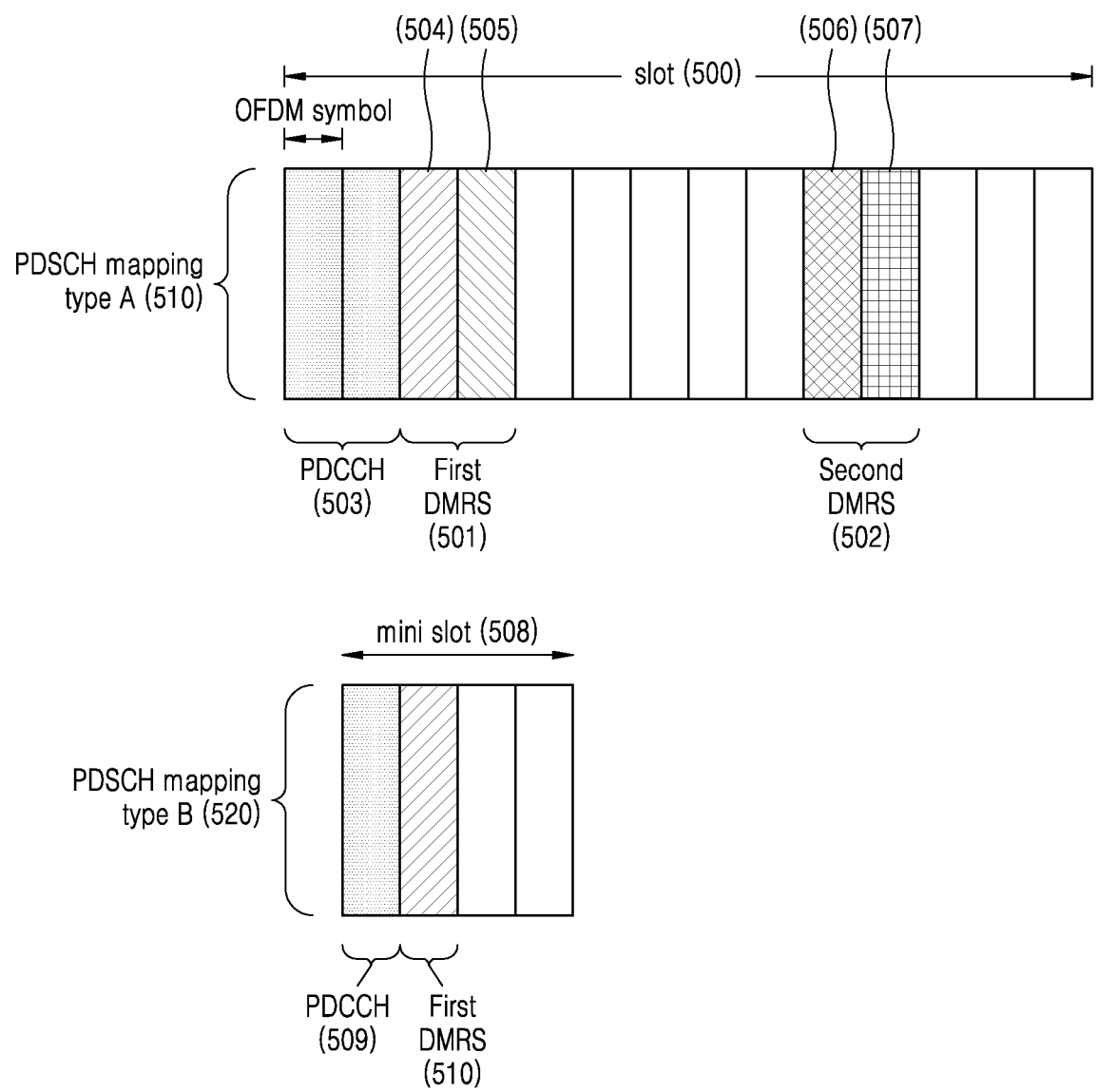
FIG. 5 illustrates a method of scheduling a downlink data channel in a 5G or NR communication system.

FIG. 5 illustrates a method of scheduling a DL data channel in a 5G or NR communication system.

Referring to FIG. 5, in the 5G or NR communication system, a position of a DMRS may differ with a mapping type of a PDSCH. In FIG. 5, a PDSCH mapping type A 510 may correspond to, for example, slot-based scheduling, and a PDSCH mapping type B 520 may correspond to non-slot-based or mini-slot-based scheduling. Slot-based scheduling may correspond to a scheme in which the PDSCH is scheduled over one slot 500, and non-slot-based or mini-slot-based scheduling may correspond to a scheme in which the PDSCH is scheduled over one mini-slot 508 set by the particular number of symbols.

Referring to FIG. 5, in the 5G or NR communication system, two DMRSs, i.e., a first DMRS 501 (also referred to as the first DMRS or a front loaded DMRS) and a second DMRS 502 (also referred to as the second DMRS or an additional DMRS) are supported. The first DMRS 501 enables fast channel estimation in decoding the PDSCH, thus being introduced to the 5G or NR communication system to shorten a processing time. The second DMRS 502 has been introduced to the 5G or NR communication system to improve channel estimation performance in the UE moving fast and compensate for and track phase distortion. For PDSCH decoding, at least the first DMRS 501 may be transmitted, and the second DMRS 502 may be additionally transmitted according to a configuration of the BS. The second DMRS 502 may be repeatedly transmitted in the same pattern as the first DMRS 501. A position of a symbol in which the first DMRS 501 is transmitted may differ with a mapping type of the PDSCH. For a PDSCH mapping type A 510, the first DMRS 501 may be transmitted in the third OFDM symbol (or fourth OFDM symbol). For a PDSCH mapping type B 520, the first DMRS 510 may be transmitted in the first OFDM symbol of a resource in which the PDSCH is scheduled. A position of a symbol in which the second DMRS 502 is transmitted may be transmitted in a fixed OFDM symbol, may be set by the BS, may be indicated to the UE in downlink control information (DCI), and may also be transmitted in various positions without being limited thereto.

In FIG. 5, for the PDSCH mapping type A 510, the first DMRS 501 is transmitted in the third OFDM symbol 504 and the fourth OFDM symbol 505, and the second DMRS 502 is transmitted in the tenth OFDM symbol 506 and the eleventh OFDM symbol 507.

Figure 6:
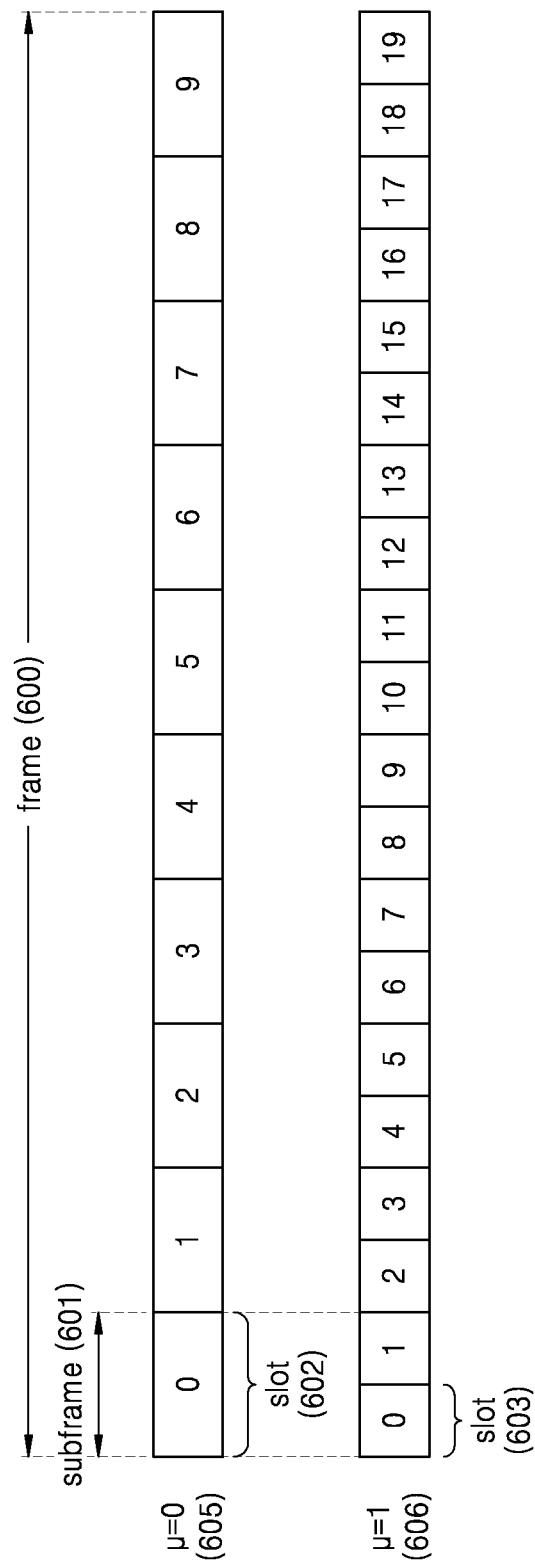
FIG. 6 illustrates a slot structure of a 5G or NR communication system.

FIG. 6 illustrates a slot structure of a 5G or NR communication system.

Referring to FIG. 6, an example of a structure of a frame 600, a subframe 601, and a slot 602 is illustrated. One frame 600 may be defined as 10 ms. One subframe 601 may be defined as 1 ms, such that one frame 600 may include a total of ten subframes 601. One slot 602 may be defined as 14 OFDM symbols. One subframe 601 may include one slot or a plurality of slots 602, and the number of slots 602 per subframe 601 may vary with set values μ 605 and 606 for a subcarrier interval. An example of FIG. 6 shows μ=0 605 and μ=1 606 as the set values for the subcarrier interval. For μ=0 605, one subframe 601 may include one slot 602, and for μ=1 606, one subframe 601 may include two slots 603.

When the number of slots 602 per subframe 601 is defined as $N_{slot}$, the number of slots 602 per frame 600, $M_{slot}$, may be $10*N_{slot}$ ($M_{slot}=10*N_{slot}$). $N_{slot}$ and $M_{slot}$ corresponding to the set values for the subcarrier interval may be defined as shown in Table 7.

TABLE 7

| M | Number of Slots per Subframe (NSlOt) | Slot per Frame (MSlot) |
|---|---|---|
| 0 | 1 | 10 |
| 1 | 2 | 20 |
| 2 | 4 | 40 |
| 3 | 8 | 80 |
| 4 | 16 | 160 |
| 5 | 32 | 320 |

A slot index in one frame 600 may be determined by $M_{slot}$. That is, the slot index may be defined as $\{0, 1, 2, \ldots, M_{slot}-2\}$. In FIG. 6, for μ=0 605, $M_{slot}=10$ according to Table 7, such that a total of 10 slot indices for the slots 602 in one frame 600 may be defined as $i_{slot} \in \{0, 1, 2, \ldots, 9\}$. Likewise, for μ=1 606, $M_{slot}=20$ according to Table 7, such that a total of 20 slot indices for the slots 603 in one frame 600 may be defined as $i_{slot} \in \{0, 1, 2, \ldots, 19\}$.

Next, a description will be made of a slot format considered in the 5G or NR communication system with reference to FIG. 7.

Figure 7:
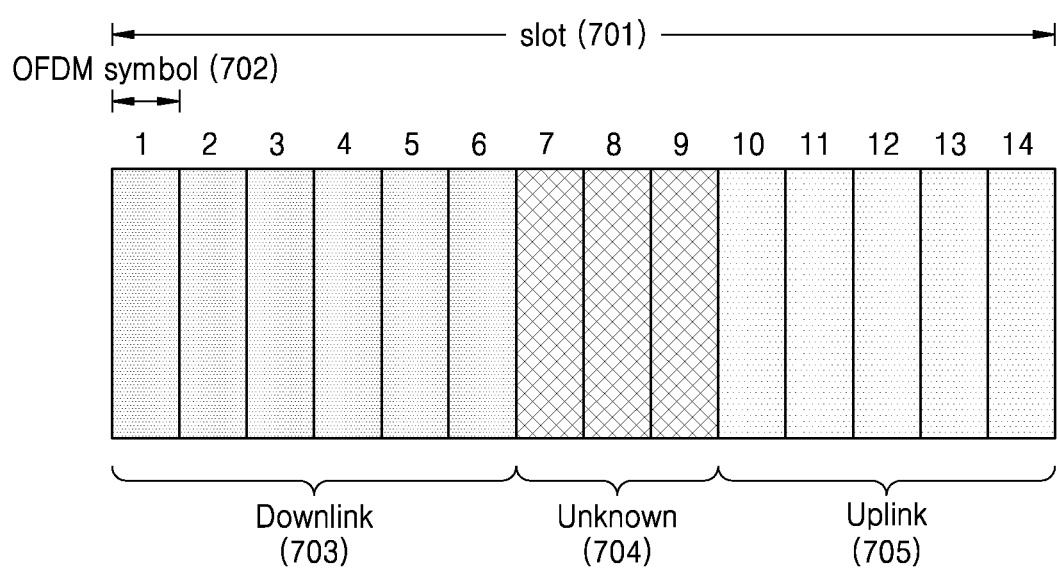
FIG. 7 illustrates an example of a slot format structure of a 5G or NR communication system.

FIG. 7 illustrates an example of a slot format structure of a 5G or NR communication system.

In the 5G or NR communication system, one frame 701 may include 14 OFDM symbols 702. Each OFDM symbol in the slot may be used as one of a downlink symbol 703, an uplink symbol 705, and an unknown symbol 704. When a symbol is the downlink symbol 703, it may mean that transmission from the BS to the UE occurs in the symbol, i.e., transmission of the BS and reception of the UE occur in the symbol. When a symbol is the uplink symbol 705, it may mean that transmission from the UE to the BS occurs in the symbol, i.e., transmission of the UE and reception of the BS occur in the symbol. When a symbol is the unknown symbol 704, it may mean that any transmission or reception does not occur between the BS and the UE in the symbol. However, the unknown symbol 704 may be overridden by another DCI, and in this case, may be used for a particular purpose indicated by information included in an indicator of the DCI.

One slot may include a combination of the downlink symbol 703, the uplink symbol 705, and the unknown symbol 704, and a particular combined form may be referred to as a slot format. That is, 14 symbols in a slot may be one of the three symbols of the downlink symbol 703, the uplink symbol 705, and the unknown symbol 704, such that a total number of possible slot formats may be 314. FIG. 7 illustrates one of possible slot formats. In FIG. 7, the first through sixth symbols are the downlink symbols 703, the seventh through ninth symbols are the unknown symbols 704, and the tenth through fourteenth symbols are the uplink symbols 705.

A slot format of a slot may be notified from the BS to the UE through a slot format indicator (SFI). The SFI may be transmitted through a group-common PDCCH. The group-common PDCCH may transmit one SFI or multiple SFIs, and the multiple SFIs indicate slot formats for multiple slots to follow. The BS may configure a UE to monitor the group-common PDCCH, and the UE configured to monitor the group-common PDCCH may monitor the group-common PDCCH and obtain the SFI from the PDCCH. The UE may be notified of a slot format of a particular slot or slots from the obtained SFI, and may identify each symbol as one of the downlink symbol 703, the uplink symbol 705, and the unknown symbol 704 according to the indicated slot format.

As described above, in the 5G or NR communication system, both slot-based scheduling and mini-slot-based scheduling may be supported as a scheduling method for a PDSCH. In the 5G or NR communication system, information about an HARQ timing (or HARQ timing information) for a PDSCH may be indicated through DCI to a UE. The HARQ timing information for the PDSCH may refer to a timing to transmit UL control information including an HARQ ACK or NACK for the PDSCH through a physical UL control channel or a PUSCH. In the present disclosure, a description will be made of a method for differently determining the HARQ timing indicated by the DCI based on a PDSCH scheduling environment. More specifically, a description will be made of a mini-slot index-based HARQ timing indication method, a symbol index-based HARQ timing indication method, a HARQ timing indication method based on a PDCCH monitoring period, etc.

Figure 8:
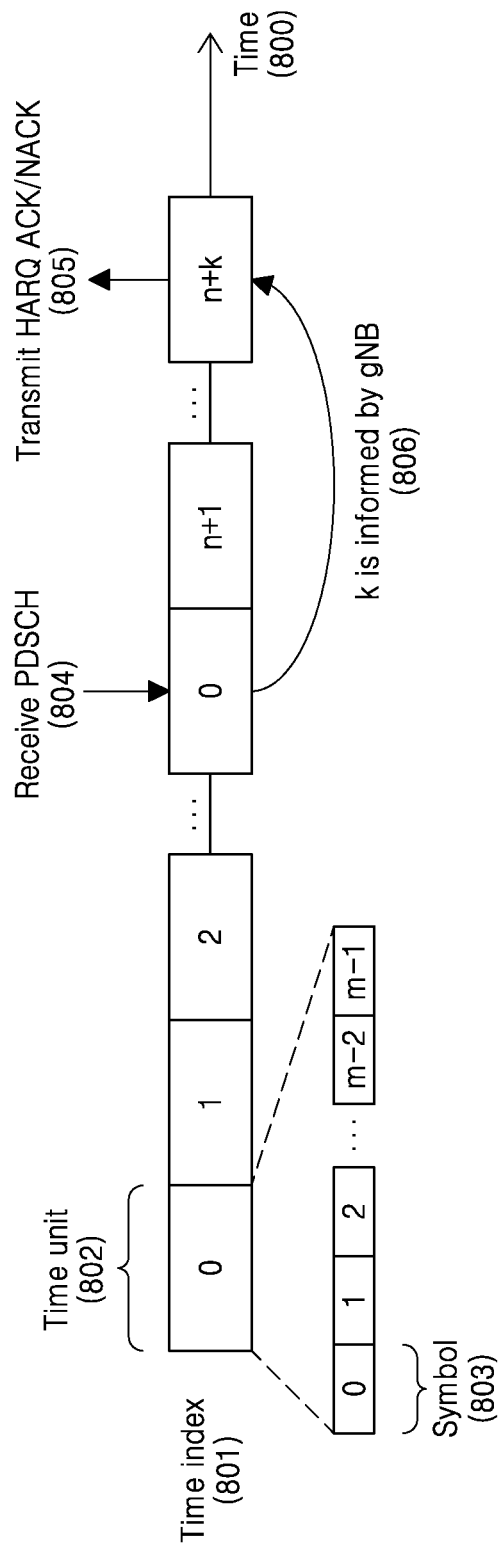
FIG. 8 is a diagram for describing a method of determining a hybrid automatic repeat request (HARQ) timing according to an embodiment.

While the disclosure is described by using the LTE system as an example, the disclosure may also be applied to other communication systems having a similar technical background or channel form. For example, a fifth-generation mobile communication technology (5G, NR) developed after LTE-A may be included in the communication systems. Thus, the disclosure may also be applied to other communication systems through some modifications within a range that does not largely depart from the scope of the disclosure based on determination of a skilled person. FIG. 8 is a diagram for describing a method of determining an HARQ timing according to an embodiment.

In the 5G or NR system, the BS may notify information about an HARQ timing for the PDSCH to the UE through higher layer signaling (e.g., RRC signaling) or DCI.

Referring to FIG. 8, a time index 801 increasing over time 800 is shown. The time index 801 may be determined by a specific time unit 802, and one time unit 802 may include m symbols 803. For example, for m=14, one time unit 802 becomes the same as a slot, such that the time index 801 may match the slot index. According to an embodiment, the UE may receive a PDSCH from the BS in a time index n in operation 804, and in a time index after k time units informed by the BS in operation 806, i.e., a time index (n+k) 801, HARQ ACK/NACK may be transmitted in operation 805.

Hereinbelow, a description will be made of an embodiment for a method, performed by the BS, of informing k corresponding to an HARQ timing and a method, performed by the UE, of determining the HARQ timing based on k informed by the UE.

In an embodiment, the HARQ timing for the PDSCH may be determined based on a slot index. Determination based on the slot index may mean that the time unit 802 that determines the time index 801 corresponds to a symbol length corresponding to one slot, i.e., m=14 symbols. That is, the time index 801 may be determined in the unit of a slot (14 symbols). In this case, the BS may notify k such that the UE transmits the HARQ ACK/NACK for the PDSCH transmitted in an $n^{th}$ slot in an $(n+k)^{th}$ slot. k may be delivered to the UE from the BS through higher layer signaling (e.g., RRC signaling) or DCI. Herein, n may correspond to a slot index including a start symbol of the PDSCH or a slot index including the last symbol of the PDSCH. The UE may be informed of k from the BS, and may transmit an HARQ ACK/NACK for an PDSCH received in the $n^{th}$ slot, in the $(n+k)^{th}$ slot. Such an embodiment may be applied to a PDSCH corresponding to slot-based scheduling (or the PDSCH mapping type A) or a PDSCH corresponding to mini-slot-based scheduling (or the PDSCH mapping type B).

In an embodiment, the HARQ timing for the PDSCH may be determined based on a mini-slot index. Determination based on the mini-slot index may mean that the time unit 802 that determines the time index 801 corresponds to a symbol length $n_{mini\_slot}$ corresponding to one mini-slot, i.e., $m=n_{mini\_slot}$. That is, the time index 801 may be determined in the unit of a mini-slot ($n_{mini\_slot}$ symbols). The mini-slot length $n_{mini\_slot}$ may be set by the BS in the UE through higher layer signaling (e.g., RRC signaling) or DCI. The mini-slot index and the slot index may follow a relationship expressed by Equation (1).

$$i_{mini\_slot} \in i_{slot} * n_{mini\_slot} + \{0,1,2, \ldots, n_{mini\_slot}-1\}$$

$i_{mini\_slot}$:Mini-Slot Index,$i_{slot}$:Slot Index (1)

In this case, the BS may notify k such that the UE transmits the HARQ ACK/NACK for the PDSCH transmitted in an $n^{th}$ mini-slot in an $(n+k)^{th}$ mini-slot. k may be delivered to the UE from the BS through higher layer signaling (e.g., RRC signaling) or DCI. Herein, n may correspond to a mini-slot index including a start symbol of the PDSCH or a mini-slot index including the last symbol of the PDSCH. The UE may be informed of k from the BS, and may transmit an HARQ ACK/NACK for a PDSCH, received in the $n^{th}$ mini-slot, in the $(n+k)^{th}$ mini-slot. Such an embodiment may be applied to a PDSCH corresponding to mini-slot-based scheduling (or the PDSCH mapping type B).

In an embodiment, the HARQ timing for the PDSCH may be determined based on a symbol index. Determination based on the symbol index may mean that the time unit 802 that determines the time index 801 corresponds to one symbol, i.e., m=1. That is, the time index 801 may be determined in the unit of a symbol. The symbol index and the slot index may follow a relationship expressed by Equation (2).

$$i_{sym} \in i_{slot} * n_{sym} + \{0,1,2, \ldots, n_{sym}-1\}$$

$i_{sym}$:Symbol Index,$i_{slot}$:Slot Index,$n_{sym}$:Number of Symbols per Slot($n_{sym}$=14) (2)

In this case, the BS may notify k such that the UE transmits an HARQ ACK/NACK for a PDSCH transmitted in an $n^{th}$ symbol in an $(n+k)^{th}$ symbol. k may be delivered to the UE from the BS through higher layer signaling (e.g., RRC signaling) or DCI. Herein, n may correspond to a start symbol position or a last symbol position of the PDSCH. The UE may be informed of k from the BS, and may transmit an HARQ ACK/NACK for an PDSCH received in the $n^{th}$ symbol, in the $(n+x)^{th}$ symbol. Such an embodiment may be applied to a PDSCH corresponding to slot-based scheduling (or the PDSCH mapping type A) or a PDSCH corresponding to mini-slot-based scheduling (or the PDSCH mapping type B).

In an embodiment, the HARQ timing for the PDSCH may be determined based on a set time index. Determination based on the set time index may mean that the time unit 802 that determines the time index 801 is set by the BS to $m=n_{config}$ symbols through higher layer signaling (e.g., RRC signaling) for application. That is, the time index 801 may be determined in the unit of $n_{config}$ symbols. The set time index and the slot index may follow a relationship expressed by Equation (3).

$$i_{config} \in i_{slot} * n_{config} + \{0,1,2, \ldots, n_{config}-1\}$$

$i_{config}$:Set Time Index,$i_{slot}$:Slot Index (3)

In this case, the BS may notify k such that the UE transmits an HARQ ACK/NACK for a PDSCH transmitted in an $n^{th}$ symbol in an $(n+k)^{th}$ symbol. k may be delivered to the UE from the BS through higher layer signaling (e.g., RRC signaling) or DCI. Herein, n may correspond to the set time index including the start symbol of the PDSCH or the set time index including the last symbol of the PDSCH. The UE may be informed of k from the BS, and may transmit an HARQ ACK/NACK for an PDSCH received in the $n^{th}$ symbol, in the $(n+k)^{th}$ symbol. Such an embodiment may be applied to the PDSCH corresponding to slot-based scheduling (or the PDSCH mapping type A) or the PDSCH corresponding to mini-slot-based scheduling (or the PDSCH mapping type B).

In an embodiment, in a method of determining an HARQ timing for a PDSCH, the time unit 802 that determines the time index 801 that is a criterion may be the same as a monitoring period for DCI that schedules the PDSCH. That is, when the monitoring period for the DCI is $n_{period}$ symbols, the time unit 802 may be $m=n_{period}$ symbols, and the time index 801 may be determined by a corresponding time unit. The monitoring period of $n_{period}$ symbols for the DCI may be set by the BS in the UE through higher layer signaling (e.g., RRC signaling). In this case, the BS may notify k such that the UE transmits an HARQ ACK/NACK for a PDSCH transmitted in an $n^{th}$ time index in an $(n+k)^{th}$ time index. k may be delivered to the UE from the BS through higher layer signaling (e.g., RRC signaling) or DCI. Herein, n may correspond to the time index including the start symbol of the PDSCH or the time index including the last symbol of the PDSCH. The UE may be informed of k from the BS, and may transmit an HARQ ACK/NACK for an PDSCH received in the $n^{th}$ time index, in the $(n+k)^{th}$ time index. Such an embodiment may be applied to the PDSCH corresponding to slot-based scheduling (or the PDSCH mapping type A) or the PDSCH corresponding to mini-slot-based scheduling (or the PDSCH mapping type B).

In an embodiment, in the method of determining the HARQ timing for the PDSCH, the time unit 802 that determines the time index 801 that is a criterion may be the same as a symbol length of a scheduled PDSCH. That is, when the symbol length of the scheduled PDSCH is $n_{sym}$, the time unit 802 may be $m=n_{sym}$ symbols, and the time unit 802 may be determined by a corresponding time unit. The symbol length $n_{sym}$ for the PDSCH may be set by the BS in the UE through higher layer signaling (e.g., RRC signaling) or DCI. In this case, the BS may notify k such that the UE transmits the HARQ ACK/NACK for the PDSCH transmitted in the $n^{th}$ time index in the $(n+k)^{th}$ time index. k may be delivered to the UE from the BS through higher layer signaling (e.g., RRC signaling) or DCI. Herein, n may correspond to the time index including the start symbol of the PDSCH or the time index including the last symbol of the PDSCH. The UE may be informed of k from the BS, and may transmit an HARQ ACK/NACK for an PDSCH received in the $n^{th}$ time index, in the $(n+k)^{th}$ time index. Such an embodiment may be applied to the PDSCH corresponding to mini-slot-based scheduling (or the PDSCH mapping type B).

In an embodiment, the BS may indicate a PDSCH scheduling scheme in the UE through DCI. For example, when a PDSCH scheduling scheme A and a PDSCH scheduling scheme B exist, the BS may indicate to the UE through DCI whether a scheduling scheme for a transmitted PDSCH is A or B. The PDSCH scheduling scheme may include at least one of slot-based scheduling, mini-slot based scheduling, mini-slot-based scheduling having a mini-slot length nminislot, or PDSCH scheduling having a particular PDSCH length $n_{sym}$.

In the following description of the embodiment, the PDSCH scheduling scheme A assumes slot-based scheduling and the PDSCH scheduling scheme B assumes mini-slot-based scheduling. However, the following embodiment may be equally applied to another PDSCH scheduling scheme without being limited to the above description.

In an embodiment, in the method of determining the HARQ timing for the PDSCH, the time unit 802 that determines the time index 801 that is a criterion may be determined differently considering a scheduling scheme for the scheduled PDSCH. That is, when the PDSCH following slot-based scheduling is received, an HARQ timing may be determined based on a time index A (e.g., the above-described slot index), and when the PDSCH following mini-slot-based scheduling is received, the HARQ timing may be determined based on a time index B (e.g., the above-described mini-slot index). When the BS indicates k corresponding to the HARQ timing through DCI, the UE may determine how to apply k as the HARQ timing based on both the received value k and a PDSCH scheduling type scheduled by the DCI.

Figure 9:
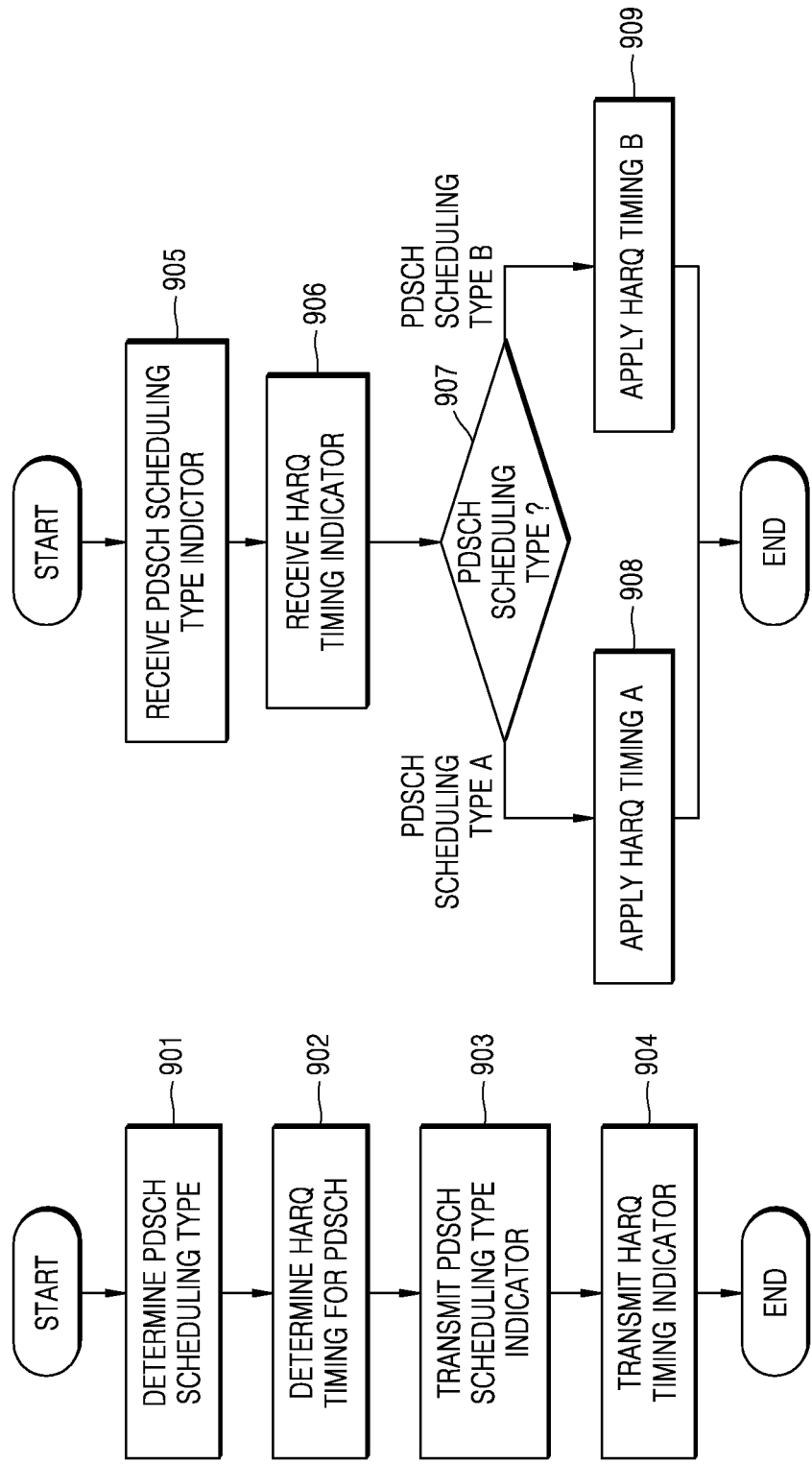
FIG. 9 is a flowchart of an operation method of a base station (BS) and a user equipment (UE), according to an embodiment.

FIG. 9 is a flowchart of an operation method of a BS and a UE, according to an embodiment.

First, in a procedure for the BS, the BS may determine a PDSCH scheduling type to be transmitted in operation 901. For example, the BS may determine whether to perform slot-based scheduling or mini-slot-based scheduling. The BS may determine an HARQ timing for a PDSCH in operation 902. The HARQ timing may be determined based on the PDSCH scheduling type determined in operation 901. The BS may transmit an indicator indicating the PDSCH scheduling type to the UE through DCI in operation 903. The BS may transmit an HARQ timing indicator for the PDSCH to the UE through the DCI in operation 904.

Next, in a procedure for the UE, the UE may receive a scheduling type indicator for the PDSCH from the BS in operation 905. The UE may receive an HARQ timing indicator for the PDSCH from the BS in operation 906. The UE may determine a scheduling type for the received PDSCH from the scheduling type indicator for the received PDSCH in operation 907. When the PDSCH scheduling type is A, the UE may apply an HARQ timing A in operation 908. When the PDSCH scheduling type is B, the UE may apply an HARQ timing B in operation 908. The UE may transmit an HARQ ACK/NACK for the received PDSCH to the BS at the determined HARQ timing.

According to an embodiment, by using a method of transmitting and receiving a DL control channel, in an environment where control regions having different types of DMRS configuration information are configured to overlap each other, a control channel may be effectively transmitted in a time and frequency resource in the overlapping control regions.

Hereinbelow, an embodiment for a method of determining n that is a criterion for determining the HARQ timing will be described.

In an embodiment, n may correspond to the above-described slot index $i_{slot}$. That is, n may correspond to a slot index in which the PDSCH is scheduled, a slot index to which a start symbol of the scheduled PDSCH belongs, a slot index to which the last symbol of the scheduled PDSCH belongs, or a slot index in which the DCI that schedules the PDSCH is detected.

In an embodiment, n may correspond to the above-described mini-slot index $i_{mini-slot}$. That is, n may correspond to a mini-slot index in which the PDSCH is scheduled, a mini-slot index to which a start symbol of the scheduled PDSCH belongs, a mini-slot index to which the last symbol of the scheduled PDSCH belongs, or a mini-slot index in which the DCI that schedules the PDSCH is detected.

In an embodiment, n may correspond to the above-described set time index $i_{config}$. That is, n may correspond to a set time index in which the PDSCH is scheduled, a set time index to which a start symbol of the scheduled PDSCH belongs, a set time index to which the last symbol of the scheduled PDSCH belongs, or a set time index in which the DCI that schedules the PDSCH is detected.

In an embodiment, n may correspond to the above-described symbol index $i_{sym}$. That is, n may correspond to a start symbol index of the scheduled PDSCH or the last symbol index of the scheduled PDSCH.

Hereinbelow, an embodiment for a method of determining a time index (n+k) for an HARQ timing for the PDSCH transmitted in the $n^{th}$ time index.

In an embodiment, the same time unit 802 of n and k may be identically applied. For example, when the time unit 802 of n is a slot, the time unit 802 of k may also be a slot. In this case, the HARQ ACK/NACK for the PDSCH transmitted in the $n^{th}$ slot may be transmitted in the $(n+k)^{th}$ slot.

In an embodiment, the time unit 802 of n and k may be differently applied. For example, when the time unit 802 of n may be a slot, the time unit 802 of k may also be a slot. In this case, the HARQ ACK/NACK for the PDSCH transmitted in the $n^{th}$ slot may be transmitted after k symbols from the last symbol of the $n^{th}$ slot. The HARQ ACK/NACK for the PDSCH transmitted in the $n^{th}$ slot may be transmitted after k symbols from the last symbol of the PDSCH transmitted in the $n^{th}$ slot. In another example, the time unit 802 of n may be a symbol, and the time unit 802 of k may be a slot. In this case, assuming that the start symbol index or the last symbol index of the scheduled PDSCH is n, the HARQ ACK/NACK may be transmitted after k*14 symbols (because the time unit of k is assumed to be a slot) from n. That is, the HARQ ACK/NACK for the PDSCH transmitted in the $n^{th}$ time index may be transmitted after k*(the time unit 802) symbols.

In the above description, the slot and the symbol have been described as an example of the time unit, but the time unit may also be identically applied to the above-described various time units, e.g., a mini-slot, a set time unit, etc.

The embodiments described so far may be equally applied to a method of determining a PDCCH-to-PDSCH timing or a PDCCH-to-PUSCH timing without being limited to an HARQ timing for a PDSCH.

The PDCCH-to-PDSCH timing may mean a time when a PDSCH scheduled by DCI detected from a PDCCH monitored in a particular time is transmitted. For example, when the PDCCH is monitored in the $n^{th}$ time index to detect the DCI, the time index in which the PDSCH scheduled by the DCI is transmitted may correspond to (n+k). The BS may notify k to the UE through higher layer signaling (e.g., RRC signaling) or DCI.

The PDCCH-to-PUSCH timing may mean a time when a PUSCH scheduled by the DCI detected from the PDCCH monitored in the particular time is transmitted. For example, when the PDCCH is monitored in the $n^{th}$ time index to detect the DCI, the time index in which the PUSCH scheduled by the DCI is transmitted may correspond to (n+k). The BS may notify k to the UE through higher layer signaling (e.g., RRC signaling) or DCI.

As such, the above-described embodiment 1 may be applied to the method of determining the PDCCH-to-PDSCH timing or the PDCCH-to-PUSCH timing.

In the 5G or NR communication system, a search space for a downlink control channel may be defined as a set of PDCCH candidates at a particular AL. A PDCCH candidate $m_{N_{ci}}$ of an AL L may be expressed by Equation (4).

$$L \cdot \left\{ \left( Y_{p,k} + \left\lfloor \frac{m_{n_{CI}} \cdot N_{CCE,p,k}}{L \cdot M_{p,max}^{(L)}} \right\rfloor + n_{CI} \right) \bmod \lfloor N_{CCE,p,k} / L \rfloor \right\} + i \quad (4)$$

L: aggregation Level,
$n_{CI}$: Carrier Index,
$N_{CCE,p,k}$: Total Number of CCEs in Control Resource Set,
k: Time Index,
$M_{p,max}^{(L)}$: Total Number of PDCCH Candidates of Aggreataion Lever L,
$m_{n_{CI}} = 0, \ldots, M_{p,max}^{(L)} - 1$,
$i = 0, \ldots, L-1$
$Y_{p,k} = (A_p \cdot Y_{p,k_p-1}) \bmod D$,
$Y_{p,-1} = n_{RNTI} \neq 0$,
$A_0 = 39827$,
$A_1 = 39829$,
$D = 65537$,
$n_{RNTI}$: UE ID or ID set by BS for UE According to Equation 4, the first CCE of a PDCCH candidate constituting the search space of the PDCCH may be determined by $Y_{p,k}$ that changes with an ID of the UE (C-RNTI or an ID set by the BS in the UE) and a time index. More specifically, a search space of a $k^{th}$ time index may be determined by $Y_{p,k}$, and a search space of a $(k+1)^{th}$ time index may be determined by $Y_{p,k}+1$. That is, the search space may change over time, thus solving a problem where a particular UE may not use a search space due to the other UEs (a blocking problem).

In the 5G or NR communication system, a monitoring period may be set differently for a different DCI format. For example, the DCI format A may be configured for monitoring in the period of A and the DCI format B may be configured for monitoring in the period of B. In this case, it is important to determine a randomization method for monitoring DCI formats having different monitoring periods in the same search space. Thus, a criterion for k among parameters that determine $Y^{p,k}$ in Equation 4 is required.

The following description will be made of various embodiments to randomize a search space.

In an embodiment, k may correspond to the slot index $i_{slot}$.

In an embodiment, k may correspond to the mini-slot index $i_{mini-slot}$.

In an embodiment, k may correspond to the symbol index $i_{sym}$.

In an embodiment, k may correspond to the set time index $i_{config}$.

In an embodiment, k may correspond to a time index based on a monitoring period for DCI as a time unit. That is, k may corresponding to a monitoring period index.

In an embodiment, when the UE defines a set of monitoring periods for X DCI formats to be monitored as $P = \{p_0, p_1, \ldots, p_{X-1}\}$, k may correspond to a time index based on a time unit that is a value corresponding to m=min(P).

In an embodiment, when the UE defines a set of monitoring periods for X DCI formats to be monitored as $P = \{p_0, p_1, \ldots, p_{X-1}\}$, k may correspond to a time index based on a time unit that is a value corresponding to m=max(P).

In an embodiment, when the UE defines a set of monitoring periods for X DCI formats to be monitored as $P = \{p_0, p_1, \ldots, p_{X-1}\}$, k may correspond to a time index based on a time unit that is a value corresponding to m={the greatest common denominator of $p_0, p_1, \ldots, p_{X-1}\}$.

In an embodiment, when the UE defines a set of monitoring periods for X DCI formats to be monitored as $P = \{p_0, p_1, \ldots, p_{X-1}\}$, k may correspond to a time index based on a time unit that is a value corresponding to m={the least common multiple of $p_0, p_1, \ldots, p_{X-1}\}$.

In an embodiment, the BS may be aware of information of a search space of a particular UE at a particular time based on the time index k, and may transmit a DL control channel to the UE through the search space. The UE may be aware of the information of the search space at the particular time based on the time index k and may monitor the DL control channel transmitted from the BS by performing blind decoding with respect to the search space.

In the 5G or NR system, a search space for a PDCCH may be configured for each DCI format size scrambled by a particular RNTI. For example, the BS may configure a search space for a DCI format A scrambled by an X-RNTI in the UE, and in this case, a configuration parameter for a search space may be as below.

[Search Space Configuration Parameter]
Number of PDCCH Candidates in each AL L
Monitoring Period for Search Space
Monitoring Occasion in Unit of Symbol in Slot for Search Space
Search Space Type (Common Search Space or UE-Specific Search Space)
Control Region Index for Monitoring Search Space For example, a search space 1 may be set for a DCI format A scrambled by an X-RNTI, and a search space 2 may be set for a DCI format B scrambled by a Y-RNTI. In this case, X and Y may be the same as or different from each other, and A and B may be the same as or different from each other.

In an embodiment, search space configuration may be given through higher layer signaling (e.g., an MIN, a system information block (SIB), UE-specific RRC signaling, etc.) or may be achieved by a pre-defined value.

In addition, based on the search space configuration parameter, DCI formats scrambled by respective RNTIs may have different search spaces. In this case, a search space for an AL L may be expressed as Equation (5) below.

$$L \cdot \left\{ \left( Y_{p,k} + \left\lfloor \frac{m_{n_{CI}} \cdot N_{CCE,p,k}}{L \cdot M_p^{(L)}} \right\rfloor + n_{CI} \right) \bmod \lfloor N_{CCE,p,k} / L \rfloor \right\} + i \quad (5)$$

L: aggregation Level,
$n_{CI}$: Carrier Index,
$N_{CCE,p,k}$: Total Number of CCEs in Control Resource Set,
k: Time Index,
$M_p^{(L)}$: Total Number of PDCCH Candidates of Aggreataion Lever L,
$m_{n_{CI}} = 0, \ldots, M_p^{(L)} - 1$,
$i = 0, \ldots, L-1$ $Y_{p,k}=(A_p \cdot Y_{p,k_p-1}) \bmod D$,
$Y_{p,-1}=n_{RNTI} \neq 0$,
$A_0=39827$,
$A_1=39829$,
$D=65537$,
$n_{RNTI}$: UE ID or ID set by BS for UE $Y_{p,k}$ may correspond to 0 for the common search space.

For the UE-specific search space, $Y_{p,k}$ may correspond to a value changing with an ID of the UE (C-RNTI or ID set by the BS to the UE) and a time index.

According to Equation 5, the search space in the AL L may be determined by the number of PDCCH candidates of the AL L, i.e., $M_p^{(L)}$. More specifically, each PDCCH candidate in the AL L may be distributed to have an equal interval ($N_{CCE,p,k}/M_p^{(L)}$) (or an interval that is closest to the equal interval) over an entire CCE set in a control region. For example, when the number of PDCCH candidates is given as $M_p^{(L)}=2$ for $N_{CCE,p,k}=1$, $Y_{p,k}=0$, and AL=1, two PDCCH candidates (PDCCH candidate #0 and PDCCH candidate #1) may correspond to CCE #0 and CCE #5. In another example, when the number of PDCCH candidates is given as $M_p^{(L)}=5$ for $N_{CCE,p,k}=1$, $Y_{p,k}=0$, and AL=1, five PDCCH candidates (PDCCH candidate #0, PDCCH candidate #1, PDCCH candidate #2, PDCCH candidate #3, and PDCCH candidate #4) may correspond to CCE #0, CCE #2, CCE #4, CCE #6, and CCE #8.

When the BS configures a search space with different parameters for different combinations of DCI formats and RNTIs in the UE, the search space may be differently defined, thus increasing the number of times of blind decoding. For example, it is assumed that there are a DCI format A scrambled by X-RNTI and a DCI format B scrambled by Y-RNTI. It is also assumed that the size of the DCI format A and the size of the DCI format B are equal to each other. In this case, for monitoring in the same search space, the DCI format A and the DCI format B do not increase the number of times of blind decoding. However, according to Equation 5, when the number of PDCCH candidates in the AL L is set differently for the DCI format A and the DCI format B, inconsistency of search spaces occurs, thus increasing the number of times of blind decoding. For example, it is assumed that the number of PDCCH candidates for AL=1 is set to 2 for the DCI format A, the number of PDCCH candidates for AL=1 is set to 5, $N_{CCE,p,k}=10$, and $Y_{p,k}=0$ (i.e., the common search space). In this case, the search space (search space 1) in AL=1 for the DCI format A may correspond to {CCE #0, CCE #5}, and the search space (search space 2) in AL=1 for the DCI format B may correspond to {CCE #0, CCE #2, CCE #4, CCE #6, CCE #8}. That is, the UE may monitor (i.e., perform blind decoding for {CCE #0, CCE #5}) the DCI format A in the search space 1, and monitor (i.e., perform blind decoding for {CCE #0, CCE #2, CCE #4, CCE #6, CCE #8}) the DCI format B in the search space 2. In this case, a total number of times of blind decoding in AL=1 may correspond to the number of PDCCH candidates corresponding to a union of the search space 1 and the search space 2, and may be six in the foregoing example.

To minimize the number of times of blind decoding with respect to different search spaces (the search space 1 and the search space 2 in the above example) corresponding to the same search space type (the common search space in the above example), the search spaces may be defined such that the search space having the smaller PDCCH candidate set (the search space 1 in the above example) becomes a sub-set of the search space having the larger PDCCH candidate set (the search space 2 in the above example). For example, when the search space 1 corresponds to {CCE #0, CCE #2} instead of {CCE #0, CCE #5}, a total number of times of blind decoding may be five.

Hereinbelow, a method of determining a search space for DCI formats having the same search space type (common search space or UE-specific search space) in the same control region will be described. In the present disclosure, a search space in the AL L in a control region p may follow Equation (6).

$$L \cdot \left\{ \left( Y_{p,k} + \left\lfloor \frac{m_{n_{CI}} \cdot N_{CCE,p,k}}{L \cdot M_{p,max}^{(L)}} \right\rfloor + n_{CI} \right) \bmod \lfloor N_{CCE,p,k}/L \rfloor \right\} + i \quad (6)$$

In Equation 6, $M_{p,max}^{(L)}$ may be defined as below.

$M_{p,max}^{(L)}$ may be defined as a maximum value among the numbers of PDCCH candidates for the ALL for all DCI formats (i.e., a DCI format A$_i$ scrambled by X$_i$-RNTI in which i=1, . . . , K and K indicates a total number of DCI formats) monitored in the control region p (i.e., set to a control region index p) and configured as the common search space for the common search space (i.e., $Y_{p,k}=0$). For example, when both search space types of a DCI format A$_1$ scrambled by X$_1$-RNTI and a DCI format A$_2$ scrambled by X$_2$-RNTI are set to common search spaces, the number of PDCCH candidates for the AL L in the search space (the search space 1) of the DCI format A$_1$ is N, and the number of PDCCH candidates for the AL L in the search space (the search space 2) of the DCI format A$_2$ is M, then $M_{p,max}^{(L)}$ may correspond to max(N,M). A function max(A, B) may output the greater value between A and B.

$M_{p,max}^{(L)}$ may be defined as a maximum value among the numbers of PDCCH candidates for the AL L for all DCI formats (i.e., a DCI format A$_i$ scrambled by X$_i$-RNTI in which i=1, . . . , K and K indicates a total number of DCI formats) monitored in the control region p (i.e., set to a control region index p) and configured as the UE-specific search space for the UE-specific search space (i.e., $Y_{p,k}=0$), for all serving cells (i.e., all carrier indices). For example, when both search space types of a DCI format A$_1$ scrambled by X$_1$-RNTI and a DCI format A$_2$ scrambled by X$_2$-RNTI are set to common search spaces, the number of PDCCH candidates for the AL L in the search space (the search space 1) of the DCI format A i is N, and the number of PDCCH candidates for the AL L in the search space (the search space 2) of the DCI format A$_2$ is M, then $M_{p,max}^{(L)}$ may correspond to max(N,M). A function max(A, B) may output the greater value between A and B.

Figure 10:
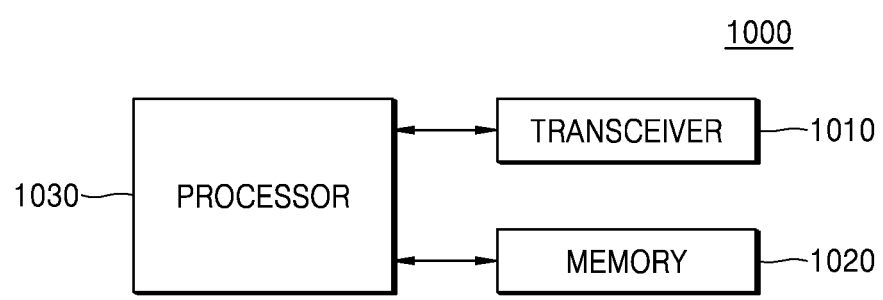
FIG. 10 is a block diagram of a structure of a UE according to an embodiment.

FIG. 10 is a block diagram of a structure of a UE according to an embodiment.

Referring to FIG. 10, a UE 1000 may include a transceiver 1010, a memory 1020, and a processor 1030. According to the above-described communication method of the UE 1000, the transceiver 1010, the memory 1020, and the processor 1030 of the UE 1000 may operate. However, components of the UE 1000 are not limited to the above-described example. For example, the UE 1000 may include components that are more than or less than the above-described components. The transceiver 1010, the memory 1020, and the processor 1030 may be implemented in a single chip form.

The transceiver 1010 may transmit and receive a signal to and from the BS. The signal may include control information and data. To this end, the transceiver 1010 may include an RF transmitter that up-converts and amplifies a frequency of a transmission signal and an RF signal that low-noise-amplifies a received signal and down-converts a frequency. However, this is merely an example of the transceiver 1010, components of which are not limited to the RF transmitter and the RF receiver.

The transceiver 1010 may receive a signal through a radio channel and output the received signal to the processor 1030, and transmit a signal output from the processor 1030 through the radio channel.

Programs and data required for an operation of the UE 1000 may also be stored in the memory 1020. Control information or data included in a signal obtained by the UE1000 may be stored in the memory 1020. The memory 1020 may include a storage medium such as read only memory (ROM), random access memory (RAM), hard-disk, compact disc (CD)-ROM, digital versatile disc (DVD), etc., or a combination thereof.

The processor 1030 may control a series of processes such that the UE 1000 may operate according to the above-described embodiments. In an embodiment, the processor 1030 may differently control a method of determining an HARQ timing and a method of randomizing a search space.

Figure 11:
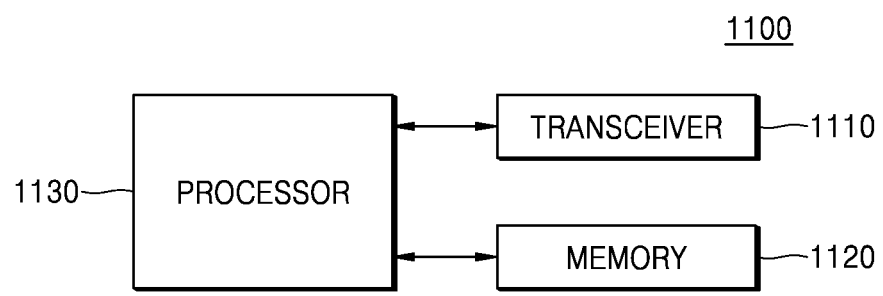
FIG. 11 is a block diagram of a structure of a BS according to an embodiment.

FIG. 11 is a block diagram of a structure of a BS according to an embodiment.

Referring to FIG. 11, a BS 1100 may include a transceiver 1110, a memory 1120, and a processor 1130. According to the above-described communication method of the BS 1100, the transceiver 1110, the memory 1120, and the processor 1130 of the BS 1100 may operate. However, components of the BS 1100 are not limited to the above-described example. For example, the BS 1100 may include components that are more than or less than the above-described components. The transceiver 1110, the memory 1120, and the processor 1130 may be implemented in a single chip form.

The transceiver 1110 may transmit and receive a signal to and from the terminal. The signal may include control information and data. To this end, the transceiver 1110 may include an RF transmitter that up-converts and amplifies a frequency of a transmission signal and an RF signal that low-noise-amplifies a received signal and down-converts a frequency. However, this is merely an example of the transceiver 1110, components of which are not limited to the RF transmitter and the RF receiver.

The transceiver 1110 may receive a signal through a radio channel and output the received signal to the processor 1130, and transmit a signal output from the processor 1130 through the radio channel.

The memory 1120 may store a program and data needed for an operation of the BS 1100. The memory 1120 may store control information or data included in a signal obtained by the BS 1100. The memory 1120 may include a storage medium such as read only memory (ROM), random access memory (RAM), hard-disk, compact disc (CD)-ROM, digital versatile disc (DVD), etc., or a combination thereof.

The processor 1130 may control a series of processes such that the BS 1100 operates according to the above-described embodiment of the disclosure. In an embodiment, the processor 1130 may differently control a method of determining an HARQ timing and a method of randomizing a search space.

The embodiments herein are provided merely for better understanding of the present disclosure, and the present disclosure should not be limited thereto or thereby. In other words, it is apparent to one of ordinary skill in the art that various changes may be made thereto without departing from the scope of the disclosure. In addition, the embodiments may be used in combination if necessary. For example, a BS and a UE may be managed by combining parts of the embodiments. Although the above-described embodiments have been described based on the NR system, modified examples based on the technical spirit of the embodiments may also be carried out in other systems such as FDD or TDD LTE systems, etc.

While exemplary embodiments have been disclosed in the specification and drawings and particular terms have been used, these have been used as generic meanings to facilitate a description of the present disclosure and to help understanding, and are not intended to limit the scope of the present disclosure. It would be obvious to those of ordinary skill in the art that many variations and modifications can be made to the disclosed embodiments based on the technical spirit of the present disclosure.

What is claimed is:

1. A method performed by a user equipment (UE) in a wireless communication system, the method comprising:
receiving, from a base station, mini slot length information indicating a value which corresponds to a number of symbols included in a mini slot, via a higher layer signaling;
receiving, from the base station, downlink control information (DCI) including hybrid automatic repeat and request (HARQ) feedback timing information indicating a number of mini slots for HARQ feedback transmission after physical downlink shared channel (PDSCH) reception scheduled by the DCI;
identifying a mini slot for the HARQ feedback transmission, based on the number of symbols included in the mini slot and the number of mini slots for the HARQ feedback transmission; and
transmitting, via a physical uplink control channel (PUCCH), HARQ feedback information on the identified mini slot.

2. The method of claim 1, wherein identifying the mini slot for the HARQ feedback transmission comprises:
identifying a mini slot n based on the PDSCH reception scheduled by the DCI; and
based on the HARQ feedback timing information indicating a value k, identifying the mini slot for the HARQ feedback transmission as a mini slot n+k.

3. The method of claim 1, further comprising:
receiving a PDSCH scheduled by the DCI; and
determining the HARQ feedback information for the PDSCH.

4. The method of claim 1, further comprising:
receiving, from the base station, a scheduling type indicator for a PDSCH; and
receiving, from the base station, the PDSCH based on the scheduling type indicator.

5. A method performed by a base station in a wireless communication system, the method comprising:
transmitting, to a user equipment (UE), mini slot length information indicating a value which corresponds to a number of symbols included in a mini slot, via a higher layer signaling;
transmitting, to the UE, downlink control information (DCI) including hybrid automatic repeat and request (HARQ) feedback timing information indicating a number of mini slots for HARQ feedback transmission after physical downlink shared channel (PDSCH) reception scheduled by the DCI; and
receiving, via a physical uplink control channel (PUCCH) from the UE, HARQ feedback information on a mini slot identified based on the number of symbols included in the mini slot and the number of mini slots for the HARQ feedback transmission.

6. The method of claim 5, wherein receiving the HARQ feedback information comprises:
based on the HARQ feedback timing information indicating a value k and a mini slot n being identified based on the PDSCH reception at the UE, receiving the HARQ feedback information based on the mini slot identified as a mini slot n+k.

7. The method of claim 5, further comprising:
transmitting a PDSCH scheduled by the DCI, to the UE.

8. The method of claim 5, further comprising:
transmitting, to the UE, a scheduling type indicator for a PDSCH; and
transmitting, to the UE, the PDSCH based on the scheduling type indicator.

9. A user equipment (UE) in a wireless communication system, the user equipment comprising:
a transceiver; and
a processor coupled with the transceiver and configured to:
receive, from a base station, mini slot length information indicating a value which corresponds to a number of symbols included in a mini slot, via a higher layer signaling,
receive, from the base station, downlink control information (DCI) including hybrid automatic repeat and request (HARQ) feedback timing information indicating a number of mini slots for HARQ feedback transmission after physical downlink shared channel (PDSCH) reception scheduled by the DCI,
identify a mini slot for the HARQ feedback transmission, based on the number of symbols included in the mini slot and the number of mini slots for the HARQ feedback transmission, and
transmit, via a physical uplink control channel (PUCCH), HARQ feedback information on the identified mini slot.

10. The UE of claim 9, wherein the processor is further configured to:
identify a mini slot n based on the PDSCH reception scheduled by the DCI, and
based on the HARQ feedback timing information indicating a value k, identify the mini slot for the HARQ feedback transmission as a mini slot n+k.

11. The UE of claim 9, wherein the processor is further configured to:
receive a PDSCH scheduled by the DCI, and
determine the HARQ feedback information for the PDSCH.

12. The UE of claim 9, wherein the processor is further configured to receive, from the base station, a scheduling type indicator for a PDSCH, and receive, from the base station, the PDSCH based on the scheduling type indicator.

13. A base station in a wireless communication system, the base station comprising:
a transceiver; and
a processor coupled with the transceiver and configured to:
transmit, to a user equipment (UE), mini slot length information indicating a value which corresponds to a number of symbols included in a mini slot, via a higher layer signaling,
transmit, to the UE, downlink control information (DCI) including hybrid automatic repeat and request (HARQ) feedback timing information indicating a number of mini slots for HARQ feedback transmission after physical downlink shared channel (PDSCH) reception scheduled by the DCI, and
receive, via a physical uplink control channel (PUCCH) from the UE, HARQ feedback information on a mini slot identified based on the number of symbols included in the mini slot and the number of mini slots for the HARQ feedback transmission.

14. The base station of claim 13, wherein the processor is further configured to:
based on the HARQ feedback timing information indicating a value k and a mini slot n being identified based on the PDSCH reception at the UE, receive the HARQ feedback information based on the mini slot identified as a mini slot n+k.

15. The base station of claim 13, wherein the processor is further configured to transmit a PDSCH scheduled by the DCI, to the UE.

16. The base station of claim 13, wherein the processor is further configured to transmit, to the UE, a scheduling type indicator for a PDSCH and transmit, to the UE, the PDSCH based on the scheduling type indicator.

* * * * *